(12) United States Patent
Chen

(10) Patent No.: US 11,100,428 B2
(45) Date of Patent: Aug. 24, 2021

(54) DISTRIBUTABLE EVENT PREDICTION AND MACHINE LEARNING RECOGNITION SYSTEM

(71) Applicant: SAS Institute Inc., Cary, NC (US)

(72) Inventor: Xu Chen, Apex, NC (US)

(73) Assignee: SAS Institute Inc., Cary, NC (US)

( * ) Notice: Subject to any disclaimer, the term of this patent is extended or adjusted under 35 U.S.C. 154(b) by 117 days.

(21) Appl. No.: 16/706,912

(22) Filed: Dec. 9, 2019

(65) Prior Publication Data

US 2020/0151603 A1 May 14, 2020

Related U.S. Application Data

(63) Continuation-in-part of application No. 16/587,104, filed on Sep. 30, 2019, now Pat. No. 10,635,947, which is a continuation-in-part of application No. 16/400,157, filed on May 1, 2019, now Pat. No. 10,430,690.

(Continued)

(51) Int. Cl.
| | |
|---|---|
| *G06N 20/00* | (2019.01) |
| *G06K 9/62* | (2006.01) |
| *G06F 17/18* | (2006.01) |
| *G06F 17/16* | (2006.01) |

(52) U.S. Cl.
CPC ............ *G06N 20/00* (2019.01); *G06F 17/16* (2013.01); *G06F 17/18* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 8,793,283 B1 * | 7/2014 | Austern | G06F 8/457 707/798 |
| 9,792,562 B1 | 10/2017 | Chen et al. | |

(Continued)

OTHER PUBLICATIONS

Camps-Valls, G. et al., "Semi-supervised graph-based hyperspectral image classification," IEEE Trans. on Geoscience and Remote Sensing, vol. 45, No. 10 (Oct. 2007) pp. 3044-3054. (Year: 2007).*

(Continued)

*Primary Examiner* — Brian M Smith
(74) *Attorney, Agent, or Firm* — Bell & Manning, LLC

(57) ABSTRACT

A computing device predicts occurrence of an event or classifies an object using distributed unlabeled data. A Laplacian matrix is computed using a kernel function. A predefined number of eigenvectors is selected from a decomposed Laplacian matrix to define a decomposition matrix. A gradient value is computed as a function of the defined decomposition matrix, a plurality of sparse coefficients, and a label matrix, a value of each coefficient of the plurality of sparse coefficients is updated based on the computed gradient value, and the computations are repeated until a convergence parameter value indicates the plurality of sparse coefficients have converged. A classification matrix is defined using the plurality of sparse coefficients to determine the target variable value for each observation vector of the plurality of unclassified observation vectors. The target variable value for each observation vector of the plurality of unclassified observation vectors is output.

30 Claims, 15 Drawing Sheets

Related U.S. Application Data

(60) Provisional application No. 62/878,472, filed on Jul. 25, 2019, provisional application No. 62/874,732, filed on Jul. 16, 2019, provisional application No. 62/805,280, filed on Feb. 13, 2019, provisional application No. 62/739,323, filed on Sep. 30, 2018.

(56) References Cited

U.S. PATENT DOCUMENTS

| | | | |
|---|---|---|---|
| 10,127,477 | B2 | 11/2018 | Chen et al. |
| 10,275,690 | B2 | 4/2019 | Chen et al. |
| 10,354,204 | B2 | 7/2019 | Chen et al. |
| 10,430,690 | B1 | 10/2019 | Chen |
| 10,521,734 | B2 | 12/2019 | Chen et al. |
| 2018/0235562 | A1* | 8/2018 | Petschke ............ A61B 6/4241 |
| 2020/0104630 | A1 | 4/2020 | Chen et al. |

OTHER PUBLICATIONS

Kornai, A. et al., answer to question on Quora message board, <www.quora.com/In-binary-classification-which-is-the-better-output-for-each-class-1-1-or-0-1-Why-What-if-the-nnulti-class-classification-is-the-case>, posted Sep. 7, 2018, 2 pp. (Year: 2018).*

Zhang, K. et al., "Sparse semi-supervised learning on low-rank kernel," Neurocomputing, vol. 129 (2014) pp. 265-272. (Year: 2014).*

Cai, D. et al., "Large scale spectral clustering via landmark-based sparse representation," IEEE Trans. on Cybernetics, vol. 45, No. 8 (Aug. 2015) pp. 1669-1680. (Year: 2015).*

Chen, X. et al., "Smooting proximal gradient method for general structured sparse regression," The Annals of Applied Statistics, vol. 6, No. 2 (2012) pp. 719-752. (Year: 2012).*

Mateos, G. et al., "Distributed sparse linear regression," IEEE Trans. on Signal Processing, vol. 58, No. 10 (Oct. 2010) pp. 5262-5276. (Year: 2010).*

Beck, A. et al., "A fast iterative shrikage-thresholding algorithm for linear inverse problems," SIAM J. Imaging Sciences, vol. 2, No. 1 (2009) pp. 183-202 (Year: 2009).*

Wang, L. et al., "Semi-supervised classification for hyperspectral imagery based on spatial-spectral label propagation," ISPRS Journal of Photogrammetry and Remote Sensing, vol. 97 (2014) pp. 123-137. (Year: 2014).*

Lu, Z. et al., "Noise-robust semi-supervised learning via fast sparse coding," Pattern Recognition, vol. 48 (2015) pp. 605-612. (Year: 2015).*

Avrachenkov, K. et al., "Distributed and asynchronous methods for semi-supervised learning," 13th Intl. Workshop on Algorithms and Models for the Web Graph (2016) 15 pp. (Year: 2016).*

Chen, W-Y. et al., "Parallel spectral clustering in distributed systems," IEEE Trans. on Pattern Analysis and Machine Learning, vol. 33, No. 3 (Mar. 2011) pp. 568-586. (Year: 2011).*

Gao, F. et al., "Distributed Approximate Spectral Clustering for Large-Scale Datasets," Proc. of the 21st Intl. Symp. on High-Performance Parallel and Distributed Computing (2012) pp. 223-234. (Year: 2012).*

Beck et al., Siam J. Imaging Sciences, vol. 2, No. 1, pp. 183-202, 2009.

Zhou, Dengyong, et al. "Learning with local and global consistency." Advances in neural information processing systems. 2004, 8 pages.

Dong-Hyun Lee, Pseudo-Label: The Simple and Efficient Semi-Supervised Learning Method for Deep Neural Networks, ICML 2013 Workshop, Challenges in Representation Learning 2013, 6 pages.

Konyushkova et al., Learning Active Learning from Data, 31$^{st}$ Conference on Neural Information Processing, 2017, pp. 1-11.

Dempster, A.P.; Laird, N.M.; Rubin, D.B. (1977). "Maximum Likelihood from Incomplete Data via the EM Algorithm". Journal of the Royal Statistical Society, Series B. 39 (1): 1-38. JSTOR 2984875. MR 0501537.

1.14. SemiSupervised—scikit-learn 0.17.1 documentation, Apr. 27, 2016, pp. 1-2.

Scikit-learn: machine learning in Python—scikit-learn 0.17.1 documentation, Apr. 27, 2016, pp. 1-3.

S. Baluja ,Probabilistic modeling for face orientation discrimination: Learning from labeled and unlabeled data, Neural Information Processing Systems, 1998.

Bennett et al., Semi-supervised support vector machines, Advances in Neural Information Processing Systems, 1998, pp. 368-374.

Blum et al., Combining Labeled and Unlabeled Data with Co-Training, COLT, 1998.

Castelli et al., On the exponential value of labeled samples, Pattern Recognition Letters 16, Jan. 1995, pp. 105-111.

Cozman et al., Semi-Supervised Learning of Mixture Models, Proceedings of the Twentieth International Conference on Machine Learning (ICML-2003), Washington DC, 2003.

Fergus et al., Semi-supervised Learning in Gigantic Image Collections, Advances in Neural Information Processing Systems, Jan. 2009.

Kullback et al., On Information and Sufficiency, Annals of Mathematical Statistics 22 (1), 1951, pp. 79-86.

T. Mitchell, The Role of Unlabeled Data in Supervised Learning, In Proceedings of the Sixth International Colloquium on Cognitive Science, San Sebastian, Spain, May 1999.

Nigam et al., Text Classification from Labeled and Unlabeled Documents using EM, Machine Learning 39, May 2000, pp. 103-134.

Pitelis et al., Semi-Supervised Learning Using an Unsupervised Atlas, Proceedings of the European Conference on Machine Learning , Sep. 2014, pp. 565-580.

Ranzato et al., Semi-supervised Learning of Compact Document Representations with Deep Networks, Proceedings of the 25 th International Conference on Machine Learning, Helsinki, Finland, 2008.

Rifai et al., The Manifold Tangent Classifier, Advances in Neural Information Processing Systems, 2011.

Riloff et al., Learning Subjective Nouns using Extraction Pattern Bootstrapping, Proceedings of the Seventh Conference on Natural Language Learning, 2003.

Rosenberg et al., Semi-Supervised Self-Training of Object Detection Models, Seventh IEEE Workshop on Applications of Computer Vision, Jan. 2005.

Vapnik, SV Machines for Pattern Recognition, Chapter 12 in Statistical Learning Theory, Wiley-Interscience, Sep. 1998.

Weston, Deep Learning via Semi-Supervised Embedding, Proceedings of the 25th International Conference on Machine Learning, Helsinki, Finland, 2008.

D. Yarowsky, Unsupervised word sense disambiguation rivaling supervised methods, Proceedings of the 33rd Annual Meeting of the Association for Computational Linguistics, 1995, pp. 189-196.

X. Zhu, Semi-Supervised Learning Literature Survey, Computer Sciences TR 1530, University of Wisconsin—Madison, 2005.

Fung et al., Semi-supervised support vector machines for unlabeled data classification, Optimization Methods and Software, 2001.

Mahapatra et al., Semi-Supervised and Active Learning for Automatic Segmentation of Crohn's Disease, Medical Image Computing and Computer-Assisted Intervention (MICCAI), 2013, pp. 214-221.

Mahapatra et al., Combining Multiple Expert Annotations Using Semi-Supervised Learning and Graph Cuts for Crohn's Disease Segmentation, Medical Image Computing and Computer-Assisted Intervention, 2014.

Badrinarayanan et al., Semi-Supervised Video Segmentation Using Tree Structured Graphical Models, IEEE Transactions on Pattern Analysis and Machine Intelligence, vol. 35, No. 11, 2013.

Su et al., Interactive Cell Segmentation based on Active and Semi-supervised Learning, IEEE Transactions on Medical Imaging, vol. 35, Issue 3, Mar. 2016.

Onofrey et al., Low-Dimensional Non-Rigid Image Registration Using Statistical Deformation Models From Semi-Supervised Training Data, IEEE Transactions on Medical Imaging, Feb. 16, 2015.

Meier et al., Patient-Specific Semi-Supervised Learning for Postoperative Brain Tumor Segmentation, Medical Image Computing and Computer-Assisted Intervention MICCAI, 2014, pp. 714-721.

(56) References Cited

OTHER PUBLICATIONS

Turian et al., Word representations: A simple and general method for semi-supervised learning , ACL Proceedings of the 48th Annual Meeting of the Association for Computational Linguistics, Jul. 2010, pp. 384-394.

Tur et al., Combining active and semi-supervised learning for spoken language understanding, Speech Communications 45, 2005, pp. 171-186.

Zhu et al., Combining Active Learning and Semi=Supervised Learning Using Gaussian Fields and Harmonic Functions, Proceedings of the ICML-2003 Workshop on the Continuum from Labeled to Unlabeled Data, 8 pages, 2003.

Kawano et al., "Semi-Supervised Logistic Discrimination Via Graph-Based Regularization," Neural Process Lett (2012) 36, pp. 203-216.

Zhang et al., "Prototype Vector Machine for Large Scale Semi-Supervised Learning," Lawrence Berkeley National Laboratory, May 29, 2012, 9 pages.

Vaswani et al., "Principal Components Null Space Analysis for Image and Video Classification," IEEE Transactions on Image Processing, vol. 15, No. 7, Jul. 2006, pp. 1816-1830.

Balcan et al., Improved Distributed Principal Component Analysis, arXiv:1408.5823v3, Nov. 13, 2014, pp. 1-9.

Datta et al., Approximate Distributed K-Means Clustering, IEEE Transactions on Knowledge and Data Engineering, ol. 21, No. 10, Oct. 2009, pp. 1372-1388.

Bhai et al., On the derivation of the Bayesian Information Criterion, Nov. 8, 2010, pp. 1-8.

Xanthopoulos P., Pardalos P.M., Trafalis T.B. (2013) Linear Discriminant Analysis. In: Robust Data Mining. SpringerBriefs in Optimization. Springer, New York, NY.

Forero et al., Consensus-Based Distributed Support Vector Machines, Journal of Machine Learning Research 11, 2010, pp. 1663-1707.

Carpenter, Gail A., dARTMAP: A Neural Network for Fast Distributed Supervised Learning, Technical Reports, Neural Networks, Dec. 1997, pp. 1-46.

Balcan et al., Distributed k-means and K-median Clustering on General Topologies, arXiv:1306.0604 [cs.LG], Jun. 2013, pp. 1-9.

Silva et al., Distributed Text Classification With an Ensemble Kernel-Based Learning Approach, IEEE Transactions on Systems, MAN, and Cybernetics—Part C: Applications and Reviews, 2009, pp. 1-11.

MacQueen, J. B. (1967). Some Methods for classification and Analysis of Multivariate Observations. Proceedings of 5th Berkeley Symposium on Mathematical Statistics and Probability. 1. University of California Press. pp. 281-297.

Chen et al., Combining Active Learning and Semi-supervised Learning by Using Selective Label Spreading, 2017 IEEE International Conference on Data Mining Workshops, 2017, pp. 850-857.

Lv et al., Positional Relevance Model for Pseudo-Relevance Feedback, SIGIR' 10, Jul. 19, 2010, pp. 1-8.

P. S. Bradley, O. L. Mangasarian, and W. N. Street, "Clustering via Concave Minimization," in Advances in Neural Information Processing Systems, vol. 9, 1997, pp. 368-374.

P.E.Black, "Manhattan Distance", in Dictionary of Algorithms and Data Structures, 2006.

Cheng, Yizong (Aug. 1995). "Mean Shift, Mode Seeking, and Clustering". IEEE Transactions on Pattern Analysis and Machine Intelligence. IEEE. 17 (8): 790-799.

Hamming, R. W. (Apr. 1950). "Error detecting and error correcting codes". The Bell System Technical Journal. 29 (2): 147-16.

Mackiewicz et al., Principal Components Analysis (PCA)*, Computers & Geosciences vol. 19, No. 3, 1993, pp. 303-342.

Jagannathan et al., Privacy-Preserving Distributed—Means Clustering over Arbitrarily Partitioned Data, KDD'05, Aug. 2005, pp. 593-599.

Van der Maaten et al., Visualizing Data using t-SNE, Journal of Machine Learning Research, 2008, pp. 2579-2605.

SAS Institute Inc. 2017. SAS® Visual Data Mining and Machine Learning 8.1: Data Mining and Machine Learning Procedures. Cary, NC: SAS Institute Inc., Mar. 2017.

SAS Institute Inc. 2016. SAS® Enterprise Miner 14.2: High-Performance Procedures. Cary, NC: SAS Institute Inc., Nov. 2016.

Lu et al., "Noise-Robust Semi-Supervised Learning by Large-Scale Sparse Coding," ResearchGate, Conference Paper, Jan. 2015.

\* cited by examiner

DISTRIBUTABLE EVENT PREDICTION AND MACHINE LEARNING RECOGNITION SYSTEM

CROSS-REFERENCE TO RELATED APPLICATIONS

The present application claims the benefit of and priority under 35 U.S.C. § 119(e) to U.S. Provisional Patent Application No. 62/878,472 filed on Jul. 25, 2019, to U.S. Provisional Patent Application No. 62/874,732 filed on Jul. 16, 2019, and to U.S. Provisional Patent Application No. 62/805,280 filed on Feb. 13, 2019, the entire contents of which is hereby incorporated by reference.

The present application is also a continuation-in-part of U.S. patent application Ser. No. 16/587,104 that was filed Sep. 30, 2019, the entire contents of which is hereby incorporated by reference. U.S. patent application Ser. No. 16/587,104 claims the benefit of and priority under 35 U.S.C. § 119(e) to U.S. Provisional Patent Application No. 62/874,732 filed on Jul. 16, 2019, the entire contents of which is hereby incorporated by reference. U.S. patent application Ser. No. 16/587,104 is also a continuation-in-part of U.S. patent application Ser. No. 16/400,157, now U.S. Pat. No. 10,430,690, that was filed May 1, 2019 and that issued Oct. 1, 2019, the entire contents of which is hereby incorporated by reference. U.S. patent application Ser. No. 16/400,157 claims the benefit of and priority under 35 U.S.C. § 119(e) to U.S. Provisional Patent Application No. 62/805,280 filed on Feb. 13, 2019, the entire contents of which is hereby incorporated by reference. U.S. patent application Ser. No. 16/400,157 also claims the benefit of and priority under 35 U.S.C. § 119(e) to U.S. Provisional Patent Application No. 62/739,323 filed on Sep. 30, 2018, the entire contents of which is hereby incorporated by reference.

BACKGROUND

Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be labeled to indicate occurrence or non-occurrence of the event or to recognize/classify the object. An unsupervised learning system predicts the label, target variable y, by defining a model that describes the hidden structure in the training data. Supervised learning requires that the target (dependent) variable y be labeled so that a model can be built to predict the label of new unlabeled data. A supervised learning system discards observations in training data that are not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data to classify the unlabeled training data in the training dataset.

SUMMARY

In an example embodiment, a non-transitory computer-readable medium is provided having stored thereon computer-readable instructions that, when executed by a computing device, cause the computing device to predict occurrence of an event or to classify an object using semi-supervised data to label unlabeled data in a dataset. A Laplacian matrix is computed using a kernel function with a plurality of observation vectors. The plurality of observation vectors includes a plurality of unclassified observation vectors and a plurality of classified observation vectors. A target variable value is defined to represent a class for each respective observation vector of the plurality of classified observation vectors. A decomposition of the computed Laplacian matrix is defined. A predefined number of eigenvectors is selected from the decomposed Laplacian matrix to define a decomposition matrix. The predefined number of eigenvectors have smallest eigenvalues relative to other eigenvectors not selected from the decomposed Laplacian matrix. (A) A gradient value is computed as a function of the defined decomposition matrix, a plurality of sparse coefficients, and a label matrix defined from the plurality of observation vectors based on the target variable value. (B) A value of each coefficient of the plurality of sparse coefficients is updated based on the computed gradient value. (A) to (B) are repeated until a convergence parameter value indicates the plurality of sparse coefficients have converged. A classification matrix is defined using the plurality of sparse coefficients. The target variable value is determined for each observation vector of the plurality of unclassified observation vectors based on the defined classification matrix. The target variable value is output for each observation vector of the plurality of unclassified observation vectors. The target variable value selected for each observation vector of the plurality of unclassified observation vectors identifies a characteristic of a respective observation vector.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to predict occurrence of an event or classify an object using semi-supervised data to label unlabeled data in a dataset.

In an example embodiment, a method of predicting occurrence of an event or classifying an object using semi-supervised data to label unlabeled data in a dataset is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A classification application 122 more accurately classifies unclassified observation vectors using a relatively small number of classified observation vectors that may be noisy, which indicates that some of the human classified observation vectors have been classified incorrectly. Existing classification methods are not designed to work effectively when some of the classified observation vectors have been classified incorrectly. These methods assume that the classifications provided as input are correct as a basis for training the method to classify unclassified observation vectors. The incorrect classifications have various causes including poorly trained, careless, tired, or irresponsible human classifiers. In some cases, even well-trained expert human classifiers can make mistakes when classifying data. For example, a trained radiologist may miss a cancer indicator that is present in an image thus incorrectly classifies the image as non-cancerous. As another example, it is often challenging to distinguish images such as classifying an image as including a wolf or a dog such as a German shepherd.

Classification application 122 provides a noise-robust distributable semi-supervised learning method that can handle noisy classified observation vectors as an input by leveraging L1 optimization and sparse coding to suppress the noisy classified observation vectors and achieve better classification performance in their presence. The operations performed by classification application 122 can be distributed to provide increased efficiency when large datasets are evaluated. There are applications for classification application 122 in many areas such as process control and equipment health monitoring, image processing and classification, data segmentation, data analysis, etc. Classification application 422 provides efficient distributable parallel computing device implementations. The results presented below further demonstrate the improved accuracy.

Figure 1:
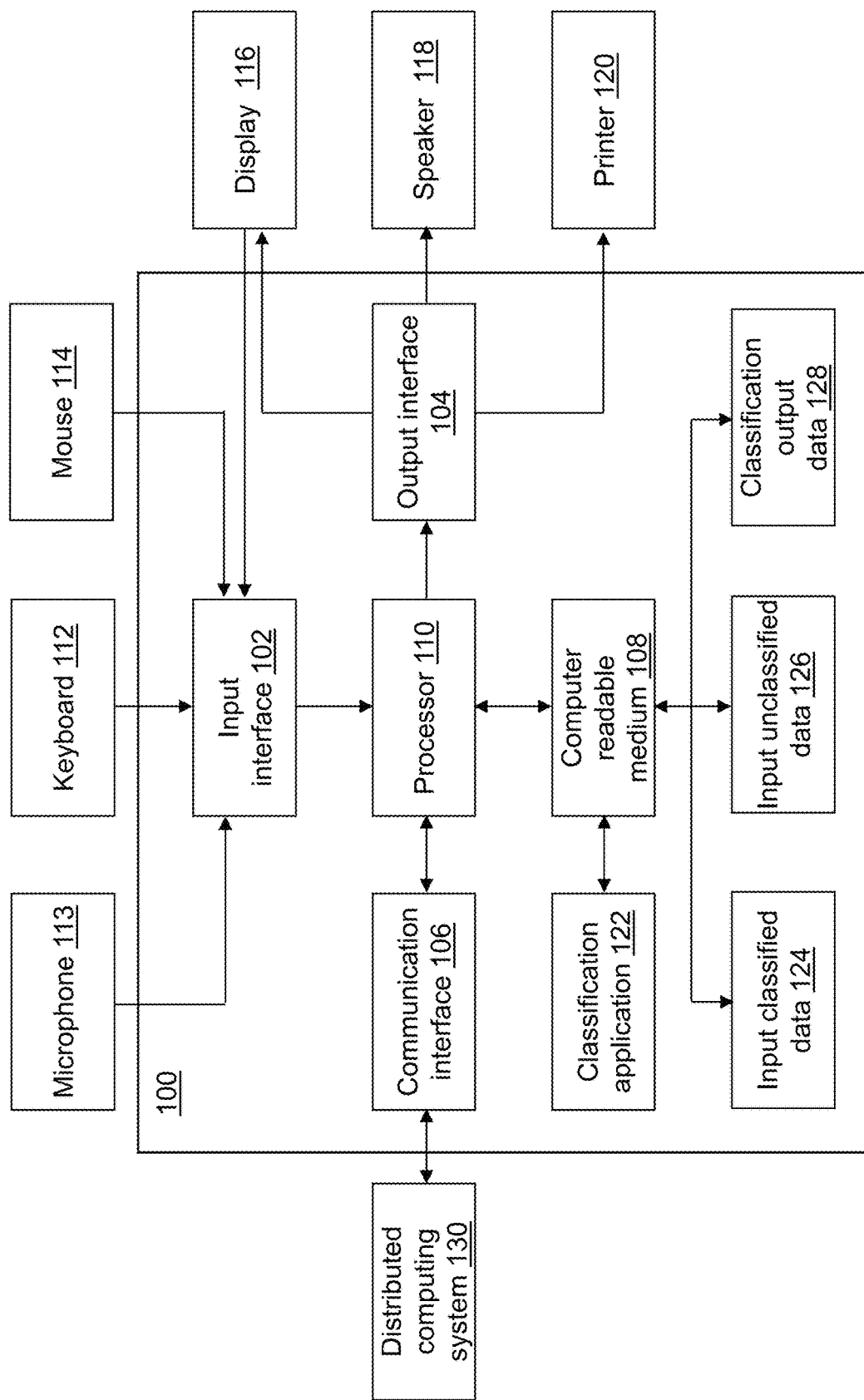
FIG. 1 depicts a block diagram of a classification device in accordance with an illustrative embodiment.

Referring to FIG. 1, a block diagram of classification device 100 is shown in accordance with an illustrative embodiment. Classification device 100 may include an input interface 102, an output interface 104, a communication interface 106, a non-transitory computer-readable medium 108, a processor 110, classification application 122, input classified data 124, input unclassified data 126, and classification output data 128. Fewer, different, and/or additional components may be incorporated into classification device 100.

Input interface 102 provides an interface for receiving information from the user or another device for entry into classification device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification device 100 or to make selections presented in a user interface displayed on display 116. The same interface may support both input interface 102 and output interface 104. For example, display 116 comprising a touch screen provides a mechanism for user input and for presentation of output to the user. Classification device 100 may have one or more input interfaces that use the same or a different input interface technology. The input interface technology further may be accessible by classification device 100 through communication interface 106.

Output interface 104 provides an interface for outputting information for review by a user of classification device 100 and/or for use by another application or device. For example, output interface 104 may interface with various output technologies including, but not limited to, display 116, a speaker 118, a printer 120, etc. Classification device 100 may have one or more output interfaces that use the same or a different output interface technology. The output interface technology further may be accessible by classification device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification device 100 may have one or more communication interfaces that use the same or a different communication interface technology. For example, classification device 100 may support communication using an Ethernet port, a Bluetooth antenna, a telephone jack, a USB port, etc. Data and/or messages may be transferred between classification device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Classification device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification device 100 also may have one or more drives that support the loading of a memory media such as a CD, DVD, an external hard drive, etc. One or more external hard drives further may be connected to classification device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification application 122 performs operations associated with classifying each observation vector included in input unclassified data 126. Some or all of the operations described herein may be embodied in classification application 122. The operations may be implemented using hardware, firmware, software, or any combination of these methods.

Referring to the example embodiment of FIG. 1, classification application 122 is implemented in software (comprised of computer-readable and/or computer-executable instructions) stored in computer-readable medium 108 and accessible by processor 110 for execution of the instructions that embody the operations of classification application 122. Classification application 122 may be written using one or more programming languages, assembly languages, scripting languages, etc. Classification application 122 may be integrated with other analytic tools. As an example, classification application 122 may be part of an integrated data analytics software application and/or software architecture such as that offered by SAS Institute Inc. of Cary, N.C., USA. Merely for illustration, classification application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification application 122 may be implemented as a Web application. For example, classification application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input classified data 124 and input unclassified data 126 may include, for example, a plurality of rows and a plurality of columns. The plurality of rows may be referred to as observation vectors or records (observations), and the columns may be referred to as variables. In an alternative embodiment, input classified data 124 and input unclassified data 126 may be transposed. The plurality of variables define a vector $x_i$ for each observation vector i=1, 2, . . . , N, where N is a number of the observation vectors included in input classified data 124 and input unclassified data 126. Input classified data 124 includes a target variable value $y_i$ for each observation vector that indicates a label or class or other characteristic defined for the respective observation vector $x_i$ for i=1, 2, . . . , n, where n is a number of the observation vectors included in input classified data 124. Input classified data 124 includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc. Input unclassified data 126 includes observation vectors $x_i$ that have not been labeled such that the $y_i$ value has not been determined though a value such as zero may be included in a column associated with the $y_i$ values. Input classified data 124 and input unclassified data 126 may be stored in a single database, file, etc. where the $y_i$ value may indicate whether the associated observation vector has been labeled or classified. For example, a $y_i$ value of zero may indicate an unclassified observation vector though in other embodiments, the $y_i$ value of zero may indicate a label, and therefor, a classified observation vector.

Input classified data 124 and input unclassified data 126 may include additional variables that are not included in the plurality of variables. One or more variables of the plurality of variables may describe a characteristic of a physical object. For example, if input classified data 124 and input unclassified data 126 include data related to operation of a vehicle, the variables may include a type of vehicle, an oil pressure, a speed, a gear indicator, a gas tank level, a tire pressure for each tire, an engine temperature, a radiator level, etc.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input classified data 124 and input unclassified data 126 may include image data captured by medical imaging equipment (i.e., computed tomography image, magnetic resonance image, x-ray image, ultrasound image, etc.) of a body part of a living thing. A subset of the image data is labeled and captured in input classified data 124, for example, as either indicating existence of a medical condition or non-existence of the medical condition. Input classified data 124 and input unclassified data 126 may include a reference to image data that may be stored, for example, in an image file or in a video file, and the existence/non-existence label associated with each image file or video file. Input classified data 124 and input unclassified data 126 may include a plurality of such references. The existence/non-existence label or other label may be defined by a clinician or expert in the field to which data stored in input classified data 124 relates.

In data science, engineering, and statistical applications, data often consists of multiple measurements (across sensors, characteristics, responses, etc.) collected across multiple time instances (patients, test subjects, etc.). These measurements may be collected in input classified data 124 and input unclassified data 126 for analysis and processing or streamed to classification device 100 as it is generated. Input classified data 124 and input unclassified data 126 may include data captured as a function of time for one or more physical objects. The data stored in input classified data 124 and input unclassified data 126 may be captured at different time points periodically, intermittently, when an event occurs, etc. Input classified data 124 and input unclassified data 126 may include data captured at a high data rate such as 200 or more observation vectors per second for one or more physical objects. One or more columns of input classified data 124 and input unclassified data 126 may include a time and/or date value. Input classified data 124 and input unclassified data 126 may include data captured under normal and abnormal operating conditions of the physical object.

The data stored in input classified data 124 and input unclassified data 126 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input classified data 124 and input unclassified data 126 may be generated as part of the Internet of Things (IoT), where things (e.g., machines, devices, phones, sensors) can be connected to networks and the data from these things collected and processed within the things and/or external to the things before being stored in input classified data 124 and input unclassified data 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 124 and input unclassified data 126.

The data stored in input classified data 124 and input unclassified data 126 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input classified data 124 and input unclassified data 126 may be stored on computer-readable medium 108 or on one or more computer-readable media of distributed computing system 130 and accessed by classification device 100 using communication interface 106, input interface 102, and/or output interface 104. Input classified data 124 and input unclassified data 126 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input classified data 124 and input unclassified data 126 may be stored using various data structures as known to those skilled in the art including one or more files of a file system, a relational database, one or more tables of a system of tables, a structured query language database, etc. on classification device 100 or on distributed computing system 130. Classification device 100 may coordinate access to input classified data 124 and input unclassified data 126 that is distributed across distributed computing system 130 that may include one or more computing devices. For example, input classified data 124 and input unclassified data 126 may be stored in a cube distributed across a grid of computers as understood by a person of skill in the art. As another example, input classified data 124 and input unclassified data 126 may be stored in a multi-node Hadoop® class. For instance, Apache™ Hadoop® is an open-source software framework for distributed computing supported by the Apache Software Foundation. As another example, input classified data 124 and input unclassified data 126 may be stored in a cloud of computers and accessed using cloud computing technologies, as understood by a person of skill in the art. The SAS® LASR™ Analytic Server may be used as an analytic platform to enable multiple users to concurrently access data stored in input classified data 124 and input unclassified data 126. The SAS Viya open, cloud-ready, in-memory architecture also may be used as an analytic platform to enable multiple users to concurrently access data stored in input classified data 124 and input unclassified data 126. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
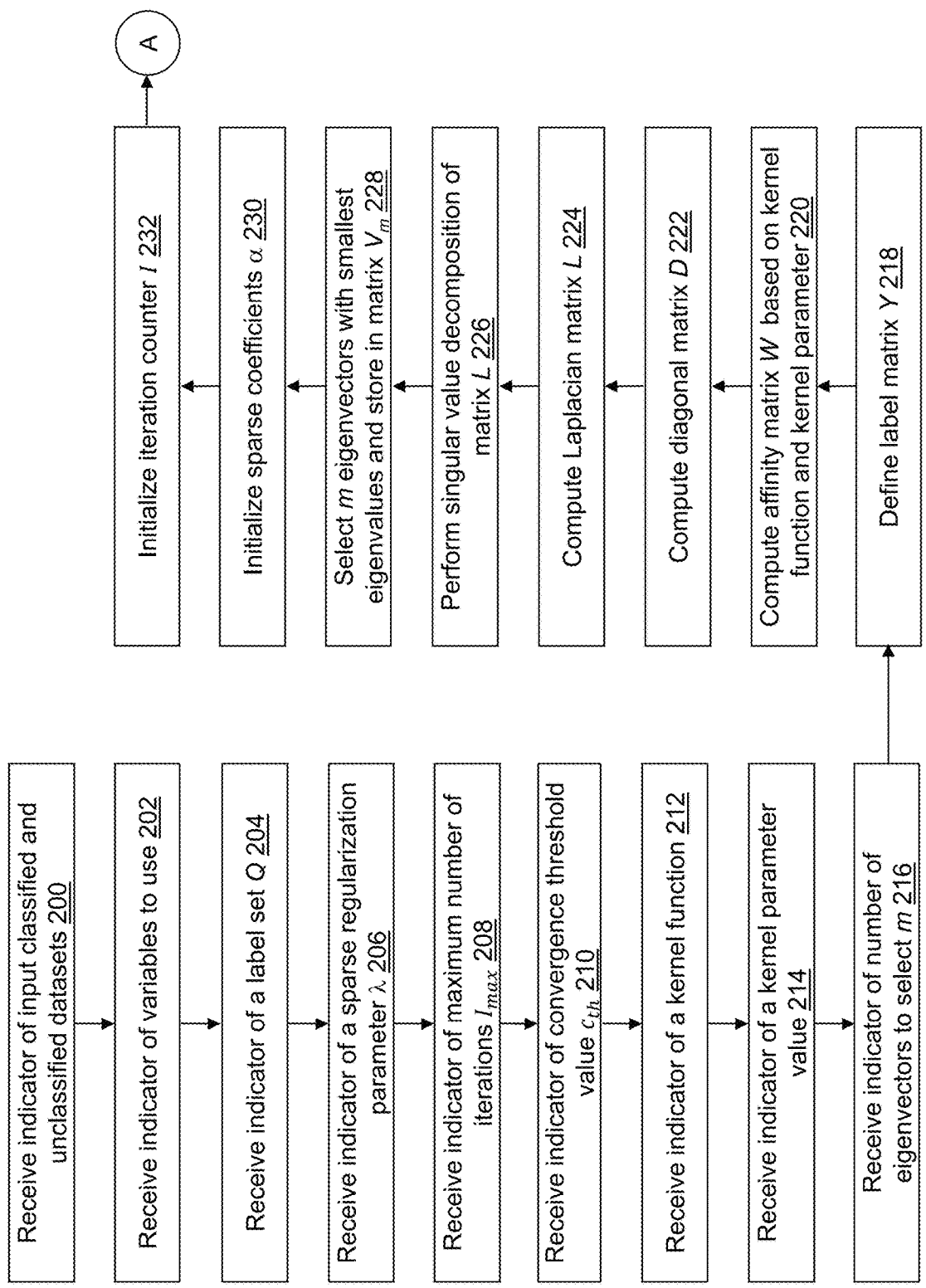
FIGS. 2A and 2B depict a flow diagram illustrating examples of operations performed by a classification application of the classification device of FIG. 1 in accordance with an illustrative embodiment.
Figure 2B:
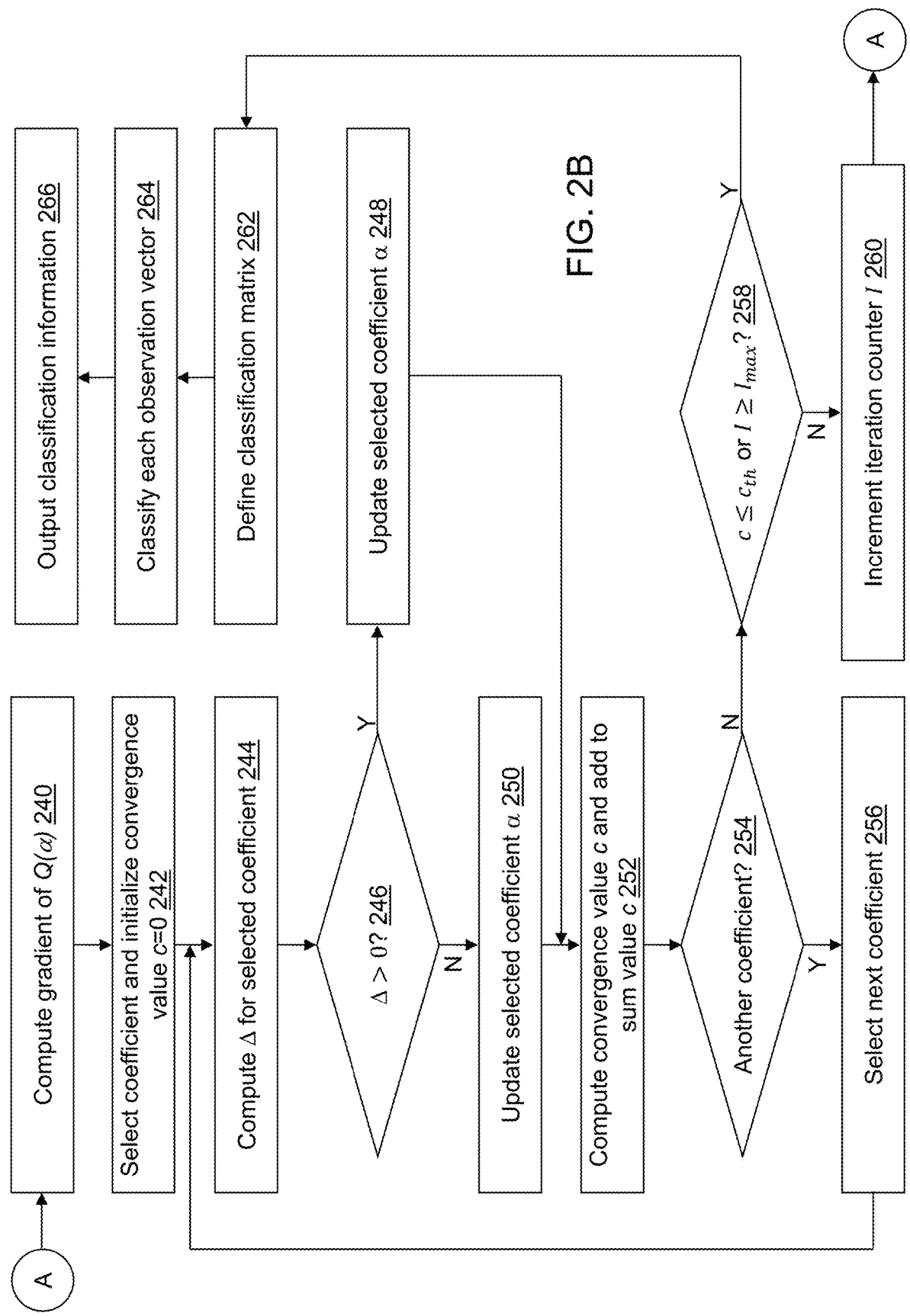

Referring to FIGS. 2A and 2B, example operations associated with classification application 122 are described when input classified data 124 and input unclassified data 126 are stored on classification device 100 and accessed by a single thread of classification device 100. Additional, fewer, or different operations may be performed depending on the embodiment of classification application 122. The order of presentation of the operations of FIGS. 2A and 2B is not intended to be limiting. Some of the operations may not be performed in some embodiments. Although some of the operational flows are presented in sequence, the various operations may be performed in various repetitions and/or in other orders than those that are illustrated. For example, a user may execute classification application 122, which causes presentation of a first user interface window, which may include a plurality of menus and selectors such as drop-down menus, buttons, text boxes, hyperlinks, etc. associated with classification application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by classification application 122.

Referring to FIG. 2A, in an operation 200, a first indicator may be received that indicates input classified data 124 and input unclassified data 126. For example, the first indicator indicates a location and a name of input classified data 124 and input unclassified data 126 that may be stored together or separately though they are described herein as separate for simplicity. As an example, the first indicator may be received by classification application 122 after selection from a user interface window or after entry by a user into a user interface window. In an alternative embodiment, input classified data 124 and input unclassified data 126 may not be selectable. For example, a most recently created dataset may be used automatically.

In an operation 202, a second indicator may be received that indicates the plurality of variables to use from input classified data 124 and input unclassified data 126 to define observation vectors. For example, the second indicator may indicate one or more column numbers or one or more column names. As another option, all of the columns of input classified data 124 and input unclassified data 126 except a first or a last column may be assumed to be the plurality of variables. The plurality of variables are the variables that define each observation vector $x_i$. A number of the plurality of variables may be indicated by $N_v$. The second indicator may further indicate a column number or a column name that stores the value for $y_i$ in input classified data 124 and/or input unclassified data 126. As another option, the first or the last column may be assumed to include the value for $y_i$.

In an operation 204, a third indicator may be received that indicates a label set Q associated with input classified data 124 and input unclassified data 126. For example, the label set Q includes a list of permissible values that the $y_i$-variable (target) value of each observation vector $x_i$ may have. For illustration, if input classified data 124 and input unclassified data 126 include text images of numeric digits, the label set Q includes c=10 permissible values that may be indicated as Q={1, . . . , c}, where Q=1 may be associated with the digit "0", Q=2 may be associated with the digit "1", Q=3 may be associated with the digit "2", . . . , Q=10 may be associated with the digit "9". No $y_i$-variable (target) value or a variable value of zero may indicate that the associated observation vector $x_i$ is not labeled in input classified data 124 and input unclassified data 126. The label set Q further may be a binary indicator that indicates the existence or non-existence of a characteristic of each observation vector. For example, a $y_i$-variable (target) value of −1 may indicate no fraud for a transaction, a $y_i$-variable (target) value of 1 may indicate that the transaction is fraudulent, and a $y_i$-variable (target) value of 0 may indicate that the transaction has not been classified.

In an operation 206, a fourth indicator of a sparse regularization parameter $\lambda$ may be received. In an alternative embodiment, the fourth indicator may not be received. For example, a default value may be stored, for example, in computer-readable medium 108 and used automatically. In another alternative embodiment, the value of the sparse regularization parameter $\lambda$ may not be selectable. Instead, a fixed, predefined value may be used. For illustration, a default value of the sparse regularization parameter $\lambda$ may be 0.7 though other values may be used.

In an operation 208, a fifth indicator of a maximum number of iterations $I_{max}$ may be received. In an alternative embodiment, the fifth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 100 though other values may be used.

In an operation 210, a sixth indicator of a convergence threshold value $c_{th}$ may be received. In an alternative embodiment, the sixth indicator may not be received. For example, a default value may be stored, for example, in computer-readable medium 108 and used automatically. In another alternative embodiment, the value of the convergence threshold value $c_{th}$ may not be selectable. Instead, a fixed, predefined value may be used. For illustration, a default value of the convergence threshold value $c_{th}$ may be 0.01 though other values may be used.

In an operation 212, a seventh indicator of a kernel function may be received. For example, the seventh indicator indicates a name of a kernel function. The seventh indicator may be received by classification application 122 after selection from a user interface window or after entry by a user into a user interface window. A default value for the kernel function may further be stored, for example, in computer-readable medium 108. As an example, a kernel function may be selected from "Gaussian", "Exponential", "Linear", "Polynomial", "Sigmoid", "Radial Basis", etc. For example, a default kernel function may be the Gaussian kernel function though any positive definite kernel function may be used. Of course, the kernel function may be labeled or selected in a variety of different manners by the user as understood by a person of skill in the art. In an alternative embodiment, the kernel function may not be selectable, and a single kernel function is implemented in classification application 122. For example, the Gaussian kernel function may be used by default or without allowing a selection. The Gaussian kernel function may be defined as:

$$\exp\frac{-\|x_i - x_j\|^2}{2s^2}$$

where s is a kernel parameter that is termed a Gaussian bandwidth parameter.

In an operation 214, an eighth indicator of a kernel parameter value to use with the kernel function may be received. For example, a value for s, the Gaussian bandwidth parameter, may be received for the Gaussian kernel function. In an alternative embodiment, the eighth indicator may not be received. For example, a default value for the kernel parameter value may be stored, for example, in computer-readable medium 108 and used automatically or the kernel parameter value may not be used. In another alternative embodiment, the value of the kernel parameter may not be selectable. Instead, a fixed, predefined value may be used.

In an operation 216, a ninth indicator of a number of eigenvectors to select m may be received. In an alternative embodiment, the number of eigenvectors to select m may not be received. For example, a default value for the number of eigenvectors to select m may be stored, for example, in computer-readable medium 108 and used automatically. In another alternative embodiment, the value of the number of eigenvectors to select m may not be selectable. Instead, a fixed, predefined value may be used.

In an operation 218, a label matrix Y is defined from input classified data 124 and input unclassified data 126. Label matrix Y is an n×c matrix with $Y_{ik}=1$ if $x_i$ is labeled as $y_i=k$. Otherwise, $Y_{ik}=0$, where k=1, . . . , c. As another option for binary data, $Y_{ik}=1$ if $y_i$ indicates true; $Y_{ik}=-1$ if $y_i$ indicates false; otherwise, $Y_{ik}0$.

In an operation 220, an affinity matrix W is computed based on the kernel function and the kernel parameter value indicated in operations 212 and 214. For example, using the Gaussian kernel function, the affinity matrix W is defined as $$W_{ij} = \exp\frac{-\|x_i - x_j\|^2}{2s^2} \text{ if } i \neq j \text{ and } W_{ii} = 0 \text{ for } i = j,$$

where s is the kernel parameter value, $x_i$ and $x_j$ are observation vectors selected from input classified data 124 and input unclassified data 126, the affinity matrix W is an N×N matrix such that i=1, . . . , N and j=1, . . . , N.

In an operation 222, a diagonal matrix D is computed based on the affinity matrix W. For example, using the Gaussian kernel function, the diagonal matrix D is an N×N matrix and is defined as $D_{ii}=\Sigma_{j=1}^{N}W_{ij}$ and $D_{ij}=0$ if $i \neq j$.

In an operation 224, a normalized graph Laplacian matrix L is computed based on the affinity matrix W and the diagonal matrix D. For example, the normalized graph Laplacian matrix L is an N×N matrix and is defined as $L=I-D^{-1/2}WD^{-1/2}$, where I is an N×N identity matrix.

In an operation 226, a singular value decomposition of the normalized graph Laplacian matrix L is performed to define eigenvectors with associated eigenvalues. For example, the singular value decomposition is defined based on $L=V\Sigma V^T$.

In an operation 228, m eigenvectors having the smallest eigenvalues are selected from the singular value decomposition V and stored in a matrix $V_m$.

In an operation 230, sparse coefficients a are each initialized, for example, to zero values.

In an operation 232, an iteration counter I is initialized, for example, as I=1, and processing continues in an operation 240 shown referring to FIG. 2B.

Referring to FIG. 2B, in operation 240, a gradient of Q(a) is computed with respect to a, where $$Q(a) = 0.5\|V_m a - Y\|_2^2 + \lambda \sum_{i=1}^{m} \sum_{ii}^{\frac{1}{2}} |a_i|.$$

For example, the gradient of Q(a) is computed using $$G(Q(a))=V_m^T(V_m a-Y),$$

where G(Q(a)) is the gradient of Q(a) and T indicates a transpose. G(Q(a)) is an m×1 vector for a binary label set or m×c matrix for a label set having c classes.

In an operation 242, a first coefficient $a_k$ is selected from the sparse coefficients a, and a convergence value c is initialized, for example, as c=0.

In an operation 244, a difference value $\Delta_k$ is computed for the selected coefficient $a_k$ using $$\Delta_k = a_k - \frac{G(Q(a_k))}{\|V_m\|_s},$$

where $\|V_m\|_s$ is a spectral norm of the matrix $V_m$.

In an operation 246, a determination is made concerning whether $\Delta_k>0$. If $\Delta_k>0$, processing continues in an operation 248. If $\Delta_k \leq 0$, processing continues in an operation 250.

In operation 248, the selected coefficient $a_k$ is updated, for example, using $$a_k = \max\left\{\Delta_k - \frac{\lambda}{\|V_m\|_s}, 0\right\},$$

and processing continues in an operation 252.

In operation 250, the selected coefficient $a_k$ is updated, for example, using $$a_k = \max\left\{-\Delta_k - \frac{\lambda}{\|V_m\|_s}, 0\right\},$$

and processing continues in operation 252.

In operation 252, a convergence value c is computed, for example, using $c=c+a_k-a'_k$, where $a'_k$ is a value of $a_k$ prior to the update in either operation 248 or operation 250. The convergence value c is a sum of a difference between the current $a_k$ and the previous $a_k$ for each coefficient of the sparse coefficients.

In an operation 254, a determination is made concerning whether there is another coefficient of the sparse coefficients to update. If there is another coefficient of the sparse coefficients to update, processing continues in an operation 256. If there is not another coefficient of the sparse coefficients to update, processing continues in an operation 258.

In operation 256, a next coefficient $a_k$ is selected from the sparse coefficients a, and processing continues in operation 244.

In operation 258, a determination is made concerning whether convergence has been achieved or the maximum number of iterations have been performed. If $c \leq c_{th}$ or $I \geq I_{max}$, processing continues in an operation 262. If $c > c_{th}$ and $I < I_{max}$, processing continues in an operation 260.

In operation 260, the iteration counter I is incremented, for example, as I=I+1, and processing continues in operation 240.

In operation 262, a classification matrix F is defined, for example, using $F = V_m a$, where classification matrix F is an N×1 vector for a binary label set or N×c matrix for a label set having c classes.

In an operation 264, each of the unclassified observation vectors in input unclassified data 126 is classified. For example, for a binary label set, if $F_i > 0$, the $y_i$-variable (target) value or class of the $i^{th}$ observation vector is predicted to be 1; whereas, if $F_i \leq 0$, the $y_i$-variable (target) value or class of the $i^{th}$ observation vector is predicted to be −1. For a label set having c classes, $y_i$ is selected for each observation vector $x_i$ based on $$y_i = \operatorname*{argmax}_{j \leq c} F_{ij}.$$

As a result, a label with a highest classification value as indicated by $$\operatorname*{argmax}_{j \leq c} F_{ij}$$

is selected as the $y_i$-variable (target) value or class for the observation vector $x_i$. The classification for each observation vector $x_i$ may be extracted from label set Q using the value of $y_i$ as an index into label set Q.

In an operation 266, the class identified for each observation vector $x_i$ included in input unclassified data 126 may be stored in classification output data 128 possibly with the respective observation vector $x_i$.

Figure 3:
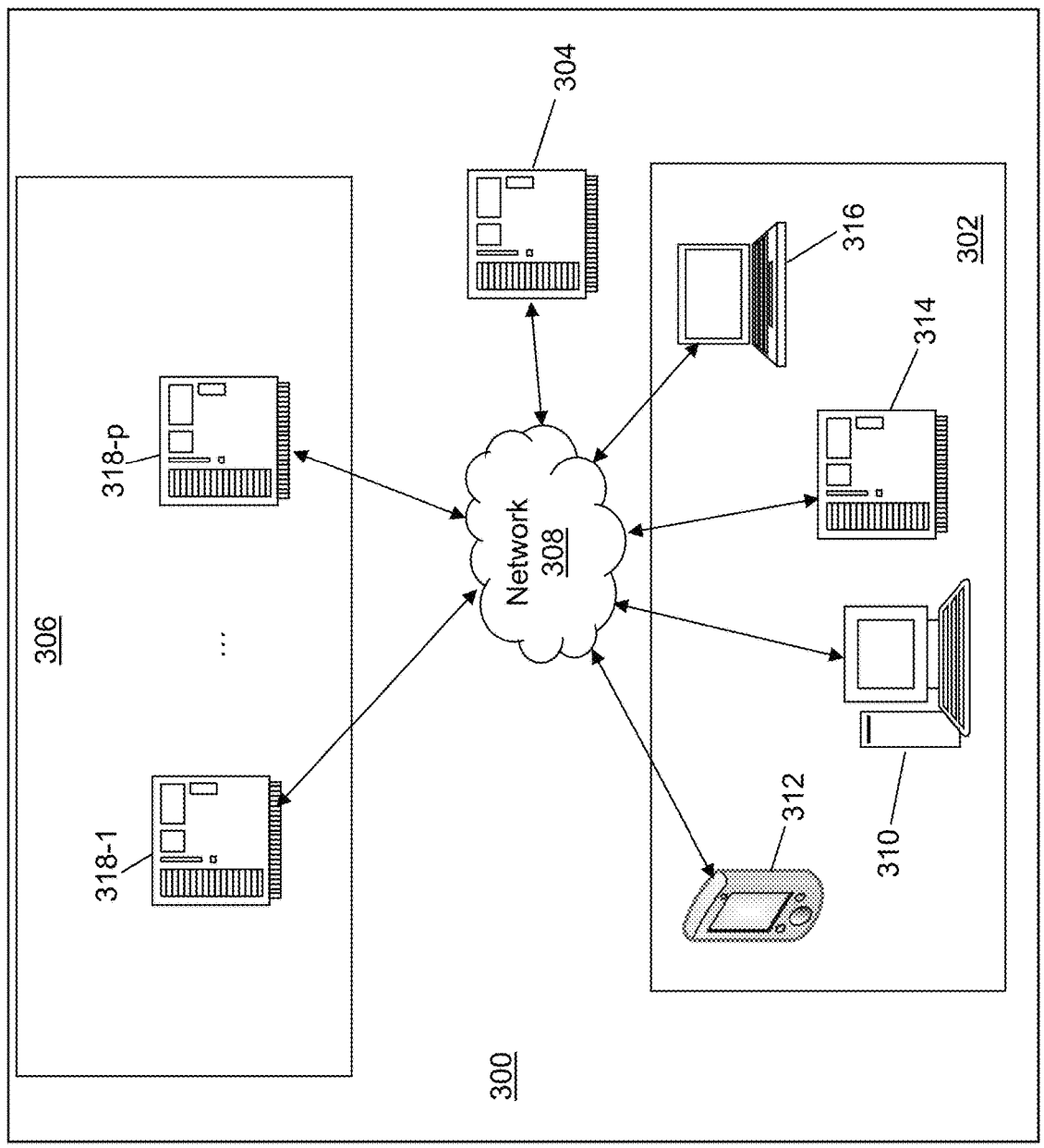
FIG. 3 depicts a block diagram of a classification system in accordance with an illustrative embodiment.

Referring to FIG. 3, a block diagram of a classification system 300 is shown in accordance with an illustrative embodiment. In an illustrative embodiment, classification system 300 may include a user system 302, a controller device 304, a worker system 306, and a network 308. Each of user system 302, controller device 304, and worker system 306 may be composed of zero or more discrete computing devices in communication through network 308. User system 302 and controller device 304 may be integrated into a single computing device capable of executing multiple threads with no worker devices of worker system 306.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of user system 302 may include computing devices of any form factor such as a desktop 310, a smart phone 312, a server computer 314, a laptop 316, a personal digital assistant, an integrated messaging device, a tablet computer, etc. User system 302 can include any number and any combination of form factors of computing devices that may be organized into subnets. In general, a "server" computer may include faster processors, additional processors, more disk memory, and/or more random access memory (RAM) than another computer form factor and support multi-threading as understood by a person of skill in the art. The computing devices of user system 302 may send and receive signals through network 308 to/from another of the one or more computing devices of user system 302 and/or to/from controller device 304. The one or more computing devices of user system 302 may communicate using various transmission media that may be wired and/or wireless as understood by those skilled in the art. The one or more computing devices of user system 302 may be geographically dispersed from each other and/or co-located.

Figure 4:
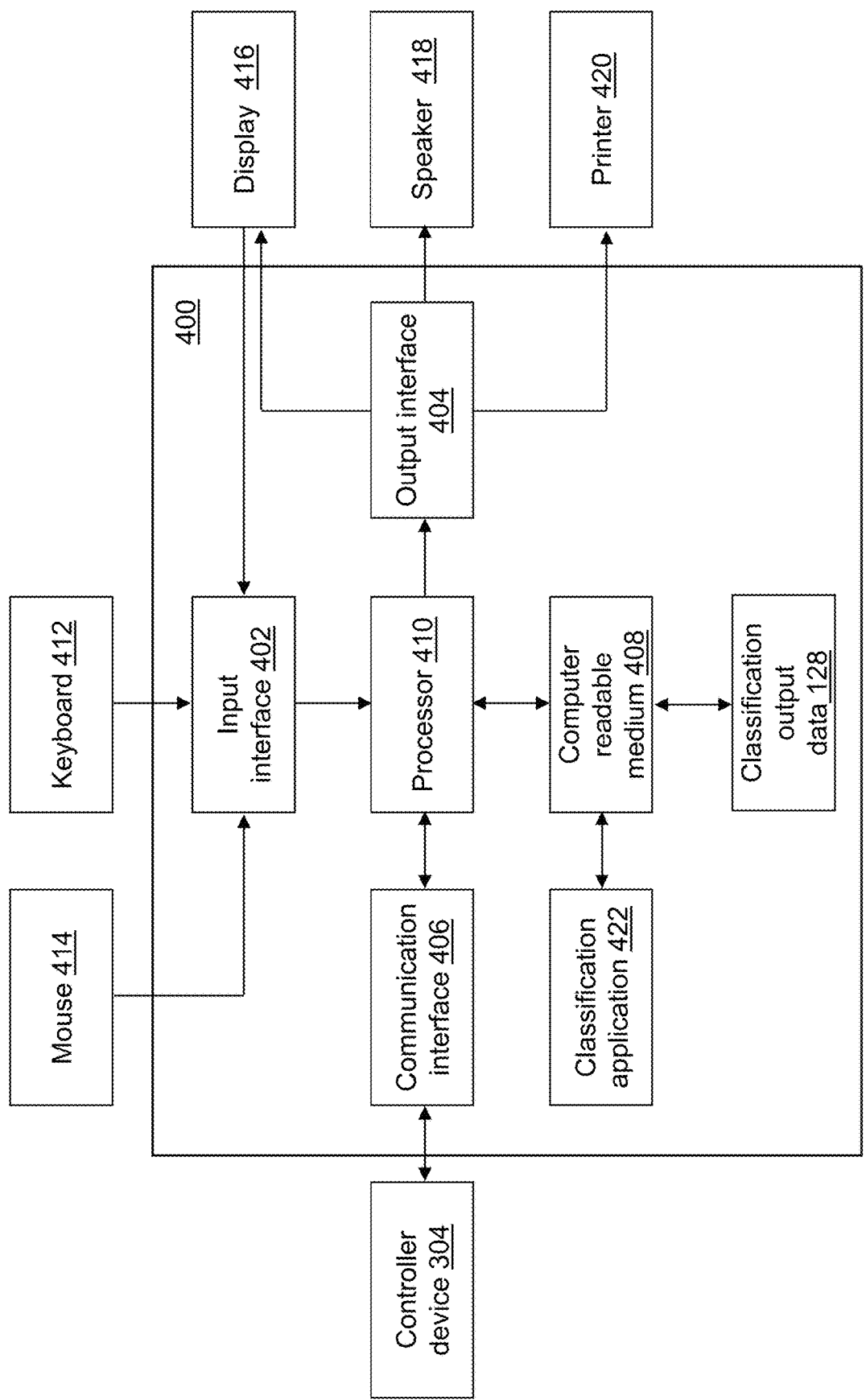
FIG. 4 depicts a block diagram of a user device of the classification system of FIG. 3 in accordance with an illustrative embodiment.

For illustration, referring to FIG. 4, a block diagram of a user device 400 is shown in accordance with an example embodiment. User device 400 is an example computing device of user system 302. For example, each of desktop 310, smart phone 312, server computer 314, and laptop 316 may be an instance of user device 400. User device 400 may include a second input interface 402, a second output interface 404, a second communication interface 406, a second computer-readable medium 408, a second processor 410, a classification application 422, and classification output data 128. Each computing device of user system 302 may be executing classification application 422 of the same or different type.

Referring again to FIG. 3, controller device 304 can include any form factor of computing device. For illustration, FIG. 3 represents controller device 304 as a server computer. Controller device 304 may send and receive signals through network 308 to/from user system 302 and/or to/from worker system 306. Controller device 304 may communicate using various transmission media that may be wired and/or wireless as understood by those skilled in the art. Controller device 304 may be implemented on a plurality of computing devices of the same or different type. Classification system 300 further may include a plurality of controller devices.

Figure 5:
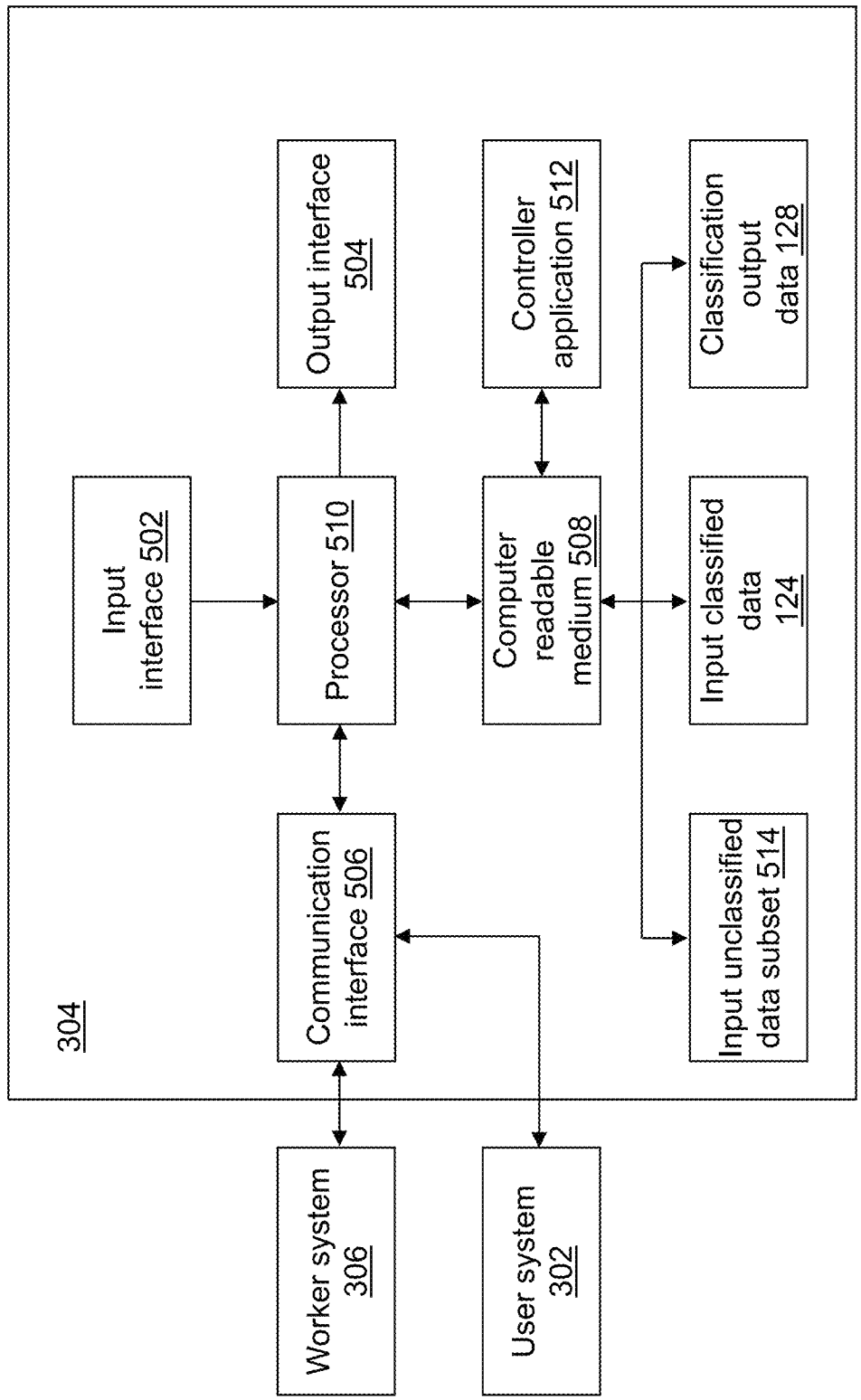
FIG. 5 depicts a block diagram of a controller device of the classification system of FIG. 3 in accordance with an illustrative embodiment.

For illustration, referring to FIG. 5, a block diagram of controller device 304 is shown in accordance with an illustrative embodiment. Controller device 304 may include a third input interface 502, a third output interface 504, a third communication interface 506, a third computer-readable medium 508, a third processor 510, a controller application 512, input classified data 124, an input unclassified data subset 514, and classification output data 128. Input unclassified data subset 514 may include zero or more including all of the observation vectors of input unclassified data 126.

Referring again to FIG. 3, the one or more computing devices of worker system 306 may include computers of any form factor such as a desktop, a server, a laptop, etc. For example, in the illustrative embodiment, worker system 306 includes a first server computer 318-$a$, . . . , and an nth server computer 318-$n$. Each server computer may support use of a plurality of threads. The computing devices of worker system 306 may send and receive signals through network 308 to/from controller device 304 and/or to/from another computing device of worker system 306. The one or more computing devices of worker system 306 may be geographically dispersed from each other and/or co-located. The one or more computing devices of worker system 306 may communicate using various transmission media that may be wired and/or wireless as understood by those skilled in the art.

Figure 6:
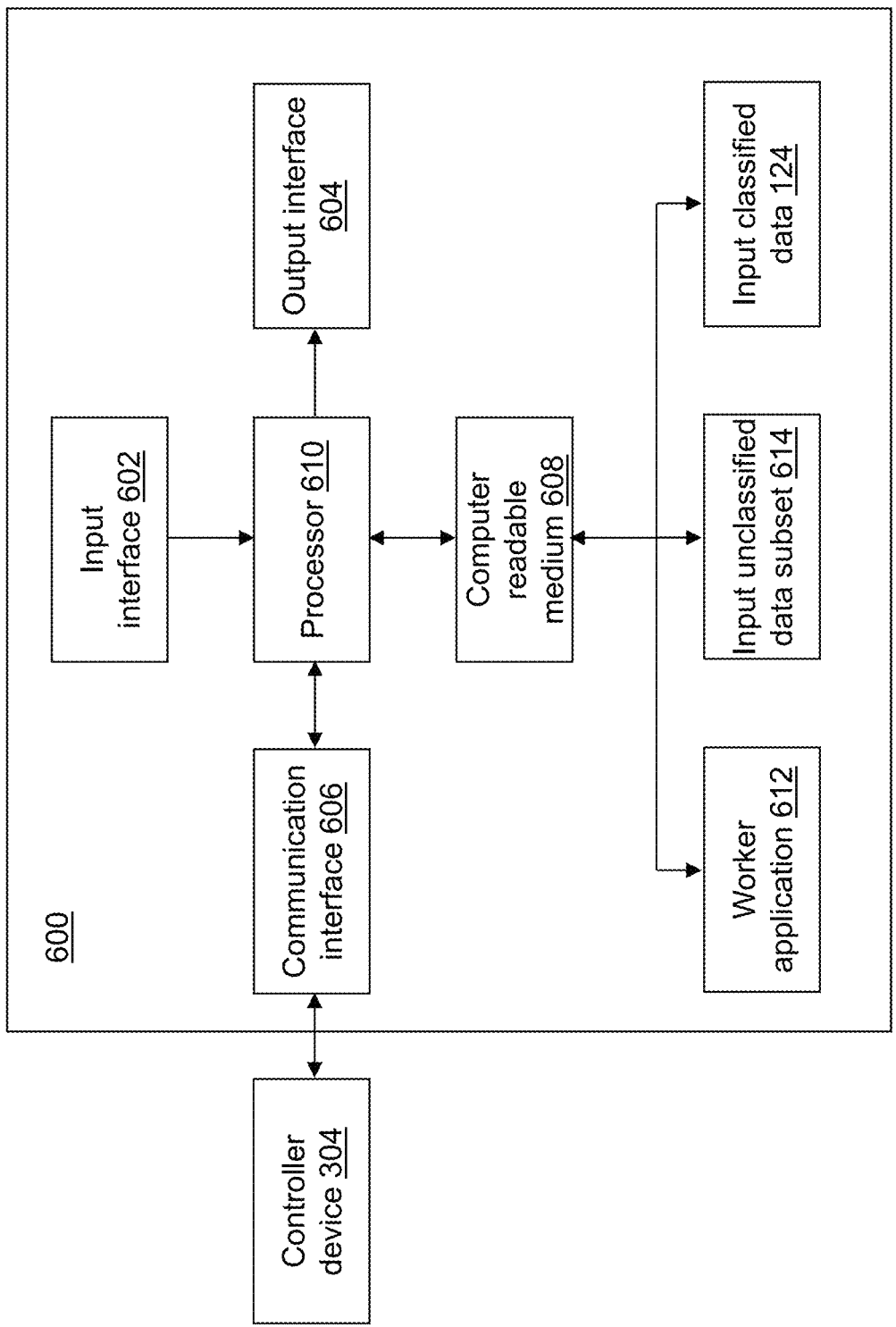
FIG. 6 depicts a block diagram of a worker-thread device of the classification system of FIG. 3 in accordance with an illustrative embodiment.

For illustration, referring to FIG. 6, a block diagram of a worker device 600 is shown in accordance with an example embodiment. Worker device 600 is an example computing device of worker system 306. For example, each of first server computer 318-a, . . . , and nth server computer 318-n may be an instance of worker device 600. Worker device 600 may include a fourth input interface 602, a fourth output interface 604, a fourth communication interface 606, a fourth computer-readable medium 608, a fourth processor 610, a worker application 612, input classified data 124, and an input unclassified data subset 614. Input unclassified data 126 may be stored in input unclassified data subset 614 distributed across each worker device 600 of worker system 306. A portion of input unclassified data 126 may also be stored in input unclassified data subset 514 stored on controller device 304.

Referring again to FIG. 4, each user device 400 of user system 302 may include the same or different components and combinations of components. Fewer, different, and additional components may be incorporated into user device 400. Second input interface 402 provides the same or similar functionality as that described with reference to input interface 102 of classification device 100 though referring to user device 400. Second output interface 404 provides the same or similar functionality as that described with reference to output interface 104 of classification device 100 though referring to user device 400. Second communication interface 406 provides the same or similar functionality as that described with reference to communication interface 106 of classification device 100 though referring to user device 400. Data and messages may be transferred between controller device 304 and user device 400 using second communication interface 406. Second computer-readable medium 408 provides the same or similar functionality as that described with reference to computer-readable medium 108 of classification device 100 though referring to user device 400. Second processor 410 provides the same or similar functionality as that described with reference to processor 110 of classification device 100 though referring to user device 400.

Classification application 422 performs operations associated with classifying the observation vectors included in input unclassified data 126 that is distributed. The operations may be implemented using hardware, firmware, software, or any combination of these methods. Referring to the example embodiment of FIG. 4, classification application 422 is implemented in software (comprised of computer-readable and/or computer-executable instructions) stored in second computer-readable medium 408 and accessible by second processor 410 for execution of the instructions that embody the operations of classification application 422. Classification application 422 may be written using one or more programming languages, assembly languages, scripting languages, etc.

Classification application 422 may be implemented as a Web application. Classification application 422 may be integrated with other analytic tools. As an example, classification application 422 may be part of an integrated data analytics software application and/or software architecture such as that offered by SAS Institute Inc. of Cary, N.C., USA. For example, classification application 422 may be part of SAS® Enterprise Miner™ developed and provided by SAS Institute Inc. of Cary, N.C., USA that may be used to create highly accurate classification and descriptive models based on analysis of vast amounts of data from across an enterprise. Merely for further illustration, classification application 422 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA. Data mining is applicable in a wide variety of industries.

Referring to FIG. 5, fewer, different, or additional components may be incorporated into controller device 304. Third input interface 502 provides the same or similar functionality as that described with reference to input interface 102 of classification device 100 though referring to controller device 304. Third output interface 504 provides the same or similar functionality as that described with reference to output interface 104 of classification device 100 though referring to controller device 304. Third communication interface 506 provides the same or similar functionality as that described with reference to communication interface 106 of classification device 100 though referring to controller device 304. Data and messages may be transferred between controller device 304 and user device 400 and/or worker device 600 using third communication interface 506. Third computer-readable medium 508 provides the same or similar functionality as that described with reference to computer-readable medium 108 of classification device 100 though referring to controller device 304. Third processor 510 provides the same or similar functionality as that described with reference to processor 110 of classification device 100 though referring to controller device 304.

Controller application 512 performs operations associated with classifying observation vectors in input unclassified data 126 that is distributed based on inputs provided from user device 400 optionally using the computing devices of worker system 306. The operations may be implemented using hardware, firmware, software, or any combination of these methods. Referring to the example embodiment of FIG. 5, controller application 512 is implemented in software (comprised of computer-readable and/or computer-executable instructions) stored in third computer-readable medium 508 and accessible by third processor 510 for execution of the instructions that embody the operations of controller application 512. Controller application 512 may be written using one or more programming languages, assembly languages, scripting languages, etc. Controller application 512 may be implemented as a Web application.

Controller application 512 may be integrated with other analytic tools. As an example, controller application 512 may be part of an integrated data analytics software application and/or software architecture such as that offered by SAS Institute Inc. of Cary, N.C., USA. For example, controller application 512 may be part of SAS® Enterprise Miner™ developed and provided by SAS Institute Inc. of Cary, N.C., USA. Merely for further illustration, controller application 512 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA.

Referring to FIG. 6, fewer, different, and additional components may be incorporated into worker device 600. Each worker device 600 of worker system 306 may include the same or different components or combination of components. Fourth input interface 602 provides the same or similar functionality as that described with reference to input interface 102 of classification device 100 though referring to worker device 600. Fourth output interface 604 provides the same or similar functionality as that described with reference to output interface 104 of classification device 100 though referring to worker device 600. Fourth communication interface 606 provides the same or similar functionality as that described with reference to communication interface 106 of classification device 100 though referring to worker device 600. Data and messages may be transferred between controller device 304 and worker device 600 using fourth communication interface 606. Fourth computer-readable medium 608 provides the same or similar functionality as that described with reference to computer-readable medium 108 of classification device 100 though referring to worker device 600. Fourth processor 610 provides the same or similar functionality as that described with reference to processor 110 of classification device 100 though referring to worker device 600.

Worker application 612 may be integrated with other analytic tools. As an example, worker application 612 may be part of an integrated data analytics software application and/or software architecture such as that offered by SAS Institute Inc. of Cary, N.C., USA. For example, worker application 612 may be part of SAS® Enterprise Miner™ developed and provided by SAS Institute Inc. of Cary, N.C., USA. Merely for further illustration, worker application 612 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Data Mining and Machine Learning, SAS® Visual Analytics, SAS® Viya™, SAS In-Memory Statistics for Hadoop®, all of which are developed and provided by SAS Institute Inc. of Cary, N.C., USA.

Classification application 422, controller application 512, and worker application 612 may be the same or different applications that are integrated in various manners to classify the observation vectors included in input unclassified data 126. A copy of input classified data 124 may be stored on controller device 304 and/or each worker device 600 of worker system 306. Input unclassified data 126 may be distributed across controller device 304 and/or each worker device 600 of worker system 306 into input unclassified data subset 514 and/or input unclassified data subset 614, respectively.

Figure 7:
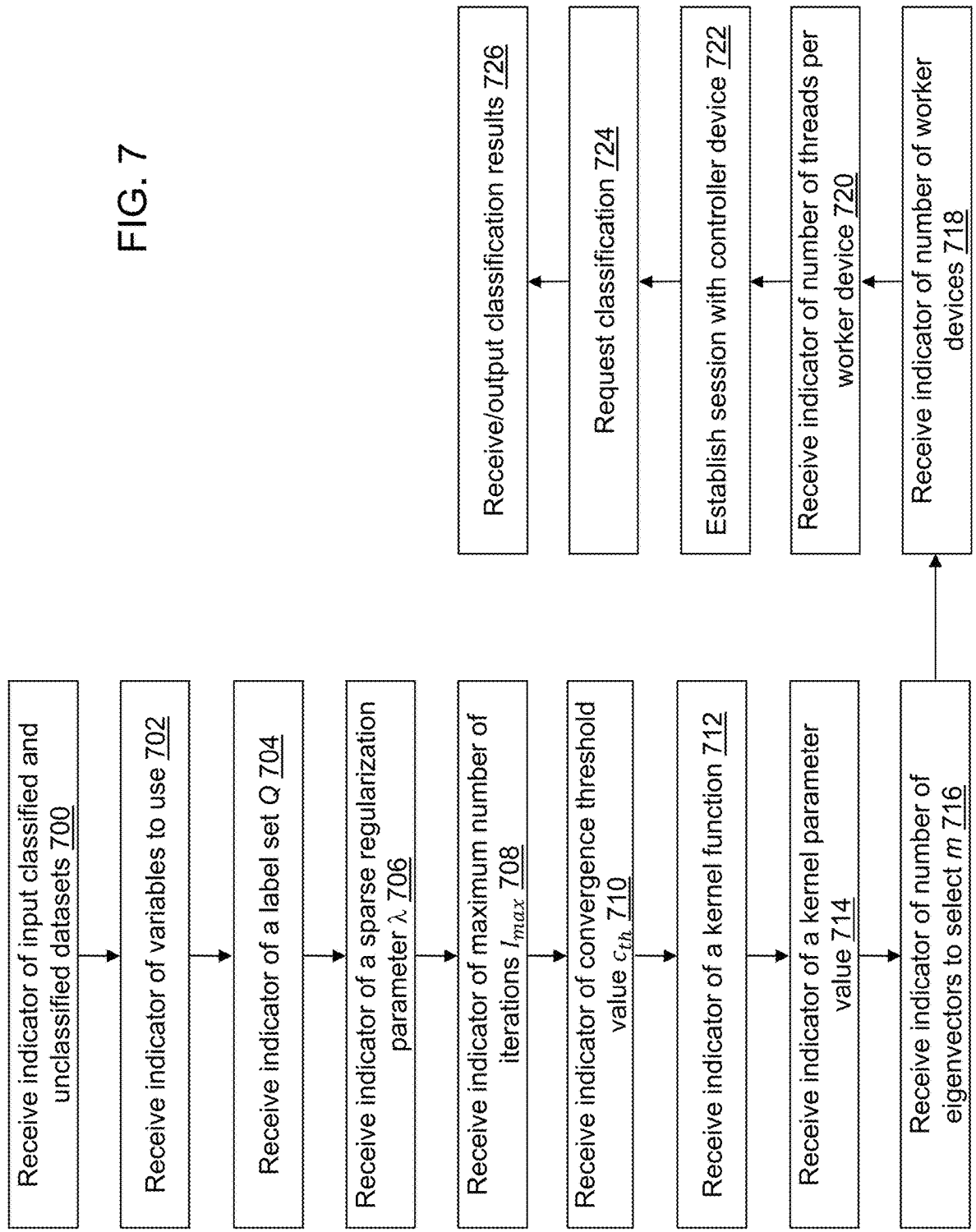
FIG. 7 depicts a flow diagram illustrating examples of operations performed by the user device of FIG. 4 in accordance with an illustrative embodiment.

Referring to FIG. 7, example operations associated with classification application 422 are described. Additional, fewer, or different operations may be performed depending on the embodiment. The order of presentation of the operations of FIG. 7 is not intended to be limiting. A user can interact with one or more user interface windows presented to the user in a display under control of classification application 422 independently or through a browser application in an order selectable by the user. Although some of the operational flows are presented in sequence, the various operations may be performed in various repetitions, concurrently, and/or in other orders than those that are illustrated. For example, a user may execute classification application 422, which causes presentation of a first user interface window, which may include a plurality of menus and selectors such as drop down menus, buttons, text boxes, hyperlinks, etc. associated with classification application 422 as understood by a person of skill in the art. As further understood by a person of skill in the art, various operations may be performed in parallel, for example, using a plurality of threads or a plurality of computing devices such as a grid or a cloud of computing devices.

Similar to classification application 122, classification application 422 may perform one or more of operations 200 to 216 to define parameters for execution of classification application 422.

Similar to operation 200, in an operation 700, the first indicator may be received that indicates input classified data 124 and input unclassified data 126. The first indicator further may indicate input unclassified data subset 514 and/or input unclassified data subset 614.

Similar to operation 202, in an operation 702, the second indicator may be received that indicates the plurality of variables to use in input classified data 124, input unclassified data subset 514, and/or input unclassified data subset 614.

Similar to operation 204, in an operation 704, the third indicator may be received that indicates the label set Q.

Similar to operation 206, in an operation 706, the fourth indicator of a sparse regularization parameter $\lambda$ may be received.

Similar to operation 208, in an operation 708, the fifth indicator of the maximum number of iterations $I_{max}$ may be received.

Similar to operation 210, in an operation 710, the sixth indicator of the convergence threshold value $c_{th}$ may be received.

Similar to operation 212, in an operation 712, the seventh indicator of a kernel function may be received.

Similar to operation 214, in an operation 714, the eighth indicator of a kernel parameter value to use with the kernel function may be received.

Similar to operation 216, in an operation 716, the ninth indicator of a number of eigenvectors to select m may be received.

In an operation 718, a tenth indicator may be received that indicates the number of computing devices W of worker system 306. In an alternative embodiment, the tenth indicator may not be received. For example, a default value may be stored, for example, in computer-readable medium 408 and used automatically. In another alternative embodiment, W may not be selectable. Instead, a fixed, predefined value may be used. The value further may be automatically determined based on a number of computing devices connected to controller device 304.

In an operation 720, an eleventh indicator may be received that indicates a number of threads T of each computing device of worker system 306 and/or of controller device 304. In an alternative embodiment, the eleventh indicator may not be received. For example, a default value may be stored, for example, in computer-readable medium 408 and used automatically. In another alternative embodiment, T may not be selectable. Instead, a fixed, predefined value may be used. The value further may be automatically determined based on a number of CPUs available in each computing device of worker system 306 and/or of controller device 304.

When W=0 and T=1, controller device 304 is performing the operations of FIGS. 2A and 2B. When W=0, controller device 304 may operate in single-machine mode meaning multithreaded operation using the number of threads T concurrently to take advantage of parallel execution on multiple processing units. When W=0, input classified data 124 and input unclassified data 126 is distributed into a plurality of input unclassified data subsets 514 with each thread of the plurality of threads allocated a single input unclassified data subset 514. When W>0, controller device 304 may be a grid host.

In an operation 722, a session is established with controller device 304 when user device 400 and controller device 304 are not integrated. The session may further be established with controller device 304 and each worker device 600 when W>0. User device 400 accepts commands from a user and relays instructions to controller device 304 when user device 400 and controller device 304 are not integrated. When W>0, controller device 304 establishes a communication network with the worker devices of worker system 306, sending instructions to the worker devices of worker system 306, collecting and aggregating the results from the worker devices of worker system 306, and/or communicating final results to user device 400.

In an operation 724, classification of the observation vectors included in input unclassified data 126 is requested. When controller device 304 and user device 400 are integrated in the same computing device, classification is initiated as described further referring to FIG. 8. The request may include zero or more of the values defined for the parameters indicated in operations 700 to 720 or zero or more of the values may be stored in a memory location known to controller device 304 when controller device 304 and user device 400 are not integrated in the same computing device.

In an operation 726, the classification results may be received from controller device 304 when controller device 304 and user device 400 are not integrated in the same computing device. As another example, an indicator may be received that indicates that the classification process is complete. For example, one or more output tables and/or one or more graphs may be presented on second display 416 when the classification process is complete. As another option, second display 416 may present a statement indicating that the classification process is complete. The user can access the output tables in a predefined location.

Figure 8:
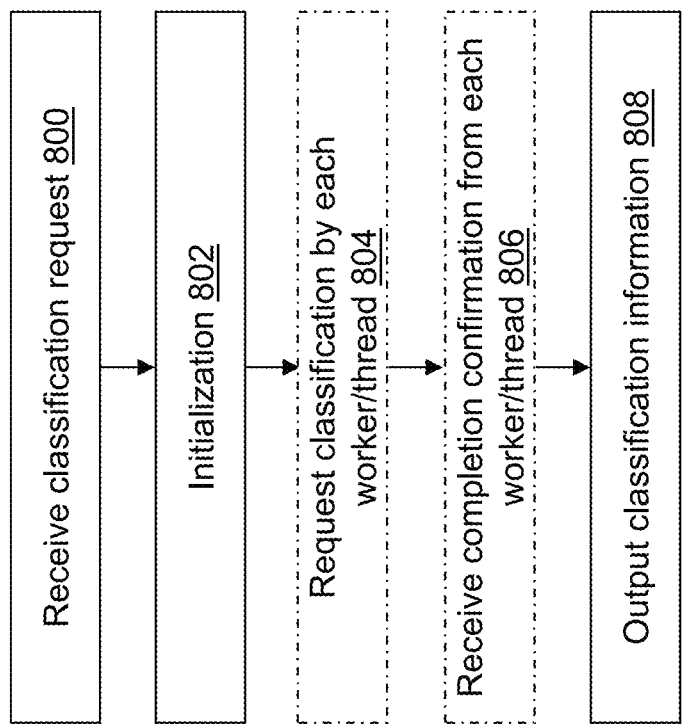
FIG. 8 depicts a flow diagram illustrating examples of operations performed by the controller device of FIG. 5 in accordance with an illustrative embodiment.

Referring to FIG. 8, example operations associated with controller application 512 are described. Additional, fewer, or different operations may be performed depending on the embodiment. The order of presentation of the operations of FIG. 8 is not intended to be limiting. Again, controller application 512 and classification application 422 may be integrated or be the same applications so that the operations of FIGS. 7 and 8 are merged.

In an operation 800, the classification request may be received from user device 400 or directly from the user of user device 400 when controller device 304 and user device 400 are integrated in the same computing device.

In an operation 802, values for the parameters indicated in operations 700 to 720 may be received from user device 400 or directly from the user of user device 400, when integrated, read from a known storage location to initialize the values locally, etc. Additionally, to the extent that input classified data 124 is not already stored on controller device 304 and/or on each worker device 600 of worker system 306, a copy is obtained. For example, controller device 304 may obtain a copy based on the first indicator and distribute a copy to each worker device 600 of worker system 306 when W>0. Similarly, to the extent that input unclassified data 126 is not already distributed across and/or each worker device 600 of worker system 306, input unclassified data 126 is distributed based on the values of W and T and whether controller device 304 is also performing operations as a worker.

In an operation 804, a request is sent to each thread of each worker device 600 of worker system 306 and/or to each thread of controller device 304. The request indicates that each worker/thread classify each observation vector included in input unclassified data subset 514 allocated to each thread of controller device 304 and/or input unclassified data subset 614 distributed to each worker device 600 and allocated to each thread of worker device 600 where the subscript w indicates an index to the respective worker device 600, and t indicates an index to the respective thread of the respective worker device 600. The request may be broadcast by a controller thread of controller device 304.

In an operation 806, confirmation that the classification process is complete may be received from each thread of each worker device 600 of worker system 306 and/or from each thread of controller device 304.

In an operation 808, the classification results may be output by controller device 304 when controller device 304 and user device 400 are not integrated in the same computing device. The classification results may be received by controller device 304 from each thread of each worker device 600 of worker system 306 and/or from each thread of controller device 304 or may be stored in a predefined location. As another example, an indicator may be received that indicates that the classification process is complete.

Figure 9A:
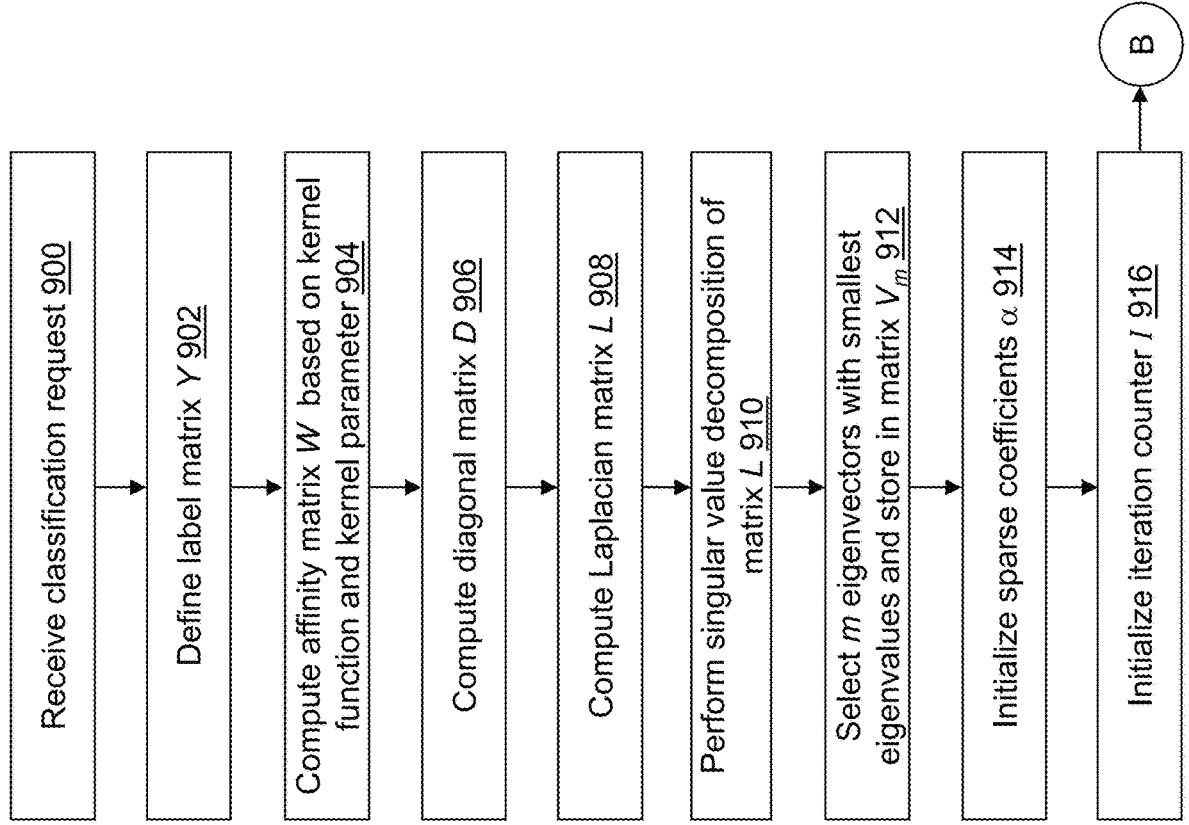
FIGS. 9A and 9B depict flow diagrams illustrating examples of operations performed by the worker-thread device of FIG. 6 in accordance with an illustrative embodiment.
Figure 9B:
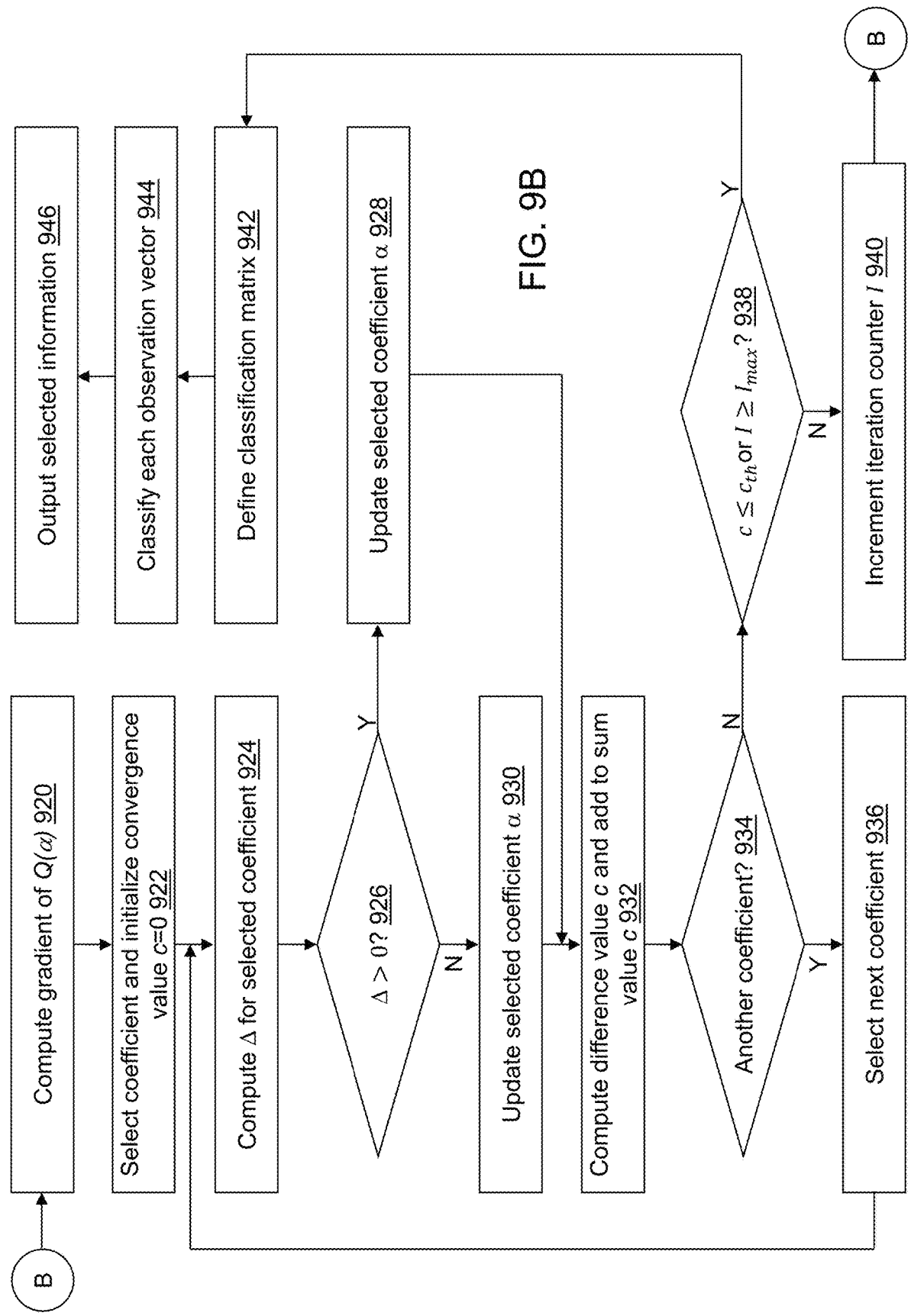

Referring to FIGS. 9A and 9B, example operations associated with worker application 612 are described. Each thread of the number of threads T of each worker device 600 of worker system 306 also execute the operations of FIGS. 9A and 9B with the assigned input unclassified data subset 514. Additional, fewer, or different operations may be performed depending on the embodiment. The order of presentation of the operations of FIGS. 9A and 9B is not intended to be limiting. When controller device 304 is acting as a worker device, each thread of the number of threads T of controller device 304 also executes the operations of FIGS. 9A and 9B with the assigned input unclassified data subset 514.

Referring to FIG. 9A, in an operation 900, the request to classify each observation vector of input unclassified data subset 614 or input unclassified data subset 514 is received from controller device 304 as a result of operation 804. The request may include one or more of the parameters indicated in operations 700 to 720.

Similar to operation 218, in an operation 902, the label matrix Y is defined from input classified data 124 and input unclassified data 126.

Similar to operation 220, in an operation 904, the affinity matrix W is computed based on the kernel function and the kernel parameter value indicated in operations 712 and 714.

Similar to operation 222, in an operation 906, the diagonal matrix D is computed based on the affinity matrix W.

Similar to operation 224, in an operation 908, the normalized graph Laplacian matrix L is computed based on the affinity matrix W and the diagonal matrix D.

Similar to operation 226, in an operation 910, the singular value decomposition of the normalized graph Laplacian matrix L is performed to define eigenvectors with associated eigenvalues.

Similar to operation 228, in an operation 912, the m eigenvectors having the smallest eigenvalues are selected from the singular value decomposition V and stored in a matrix $V_m$.

Similar to operation 230, in an operation 914, the sparse coefficients a are initialized.

Similar to operation 232, in an operation 916, the iteration counter I is initialized, for example, as I=1, and processing continues in an operation 920 shown referring to FIG. 9B.

Referring to FIG. 9B, similar to operation 240, in operation 920, the gradient of Q(a) is computed with respect to a.

Similar to operation 242, in an operation 922, the first coefficient $a_k$ is selected from the sparse coefficients a, and a convergence value c is initialized, for example, as c=0.

Similar to operation 244, in an operation 924, the difference value $\Delta_k$ is computed for the selected coefficient $a_k$ using $$\Delta_k = a_k - \frac{G(Q(a_k))}{\|V_m\|_s},$$

where $\|V_m\|_s$ is a spectral norm of the matrix $V_m$.

Similar to operation 246, in an operation 926, the determination is made concerning whether $\Delta_k>0$. If $\Delta_k>0$, processing continues in an operation 928. If $\Delta_k \leq 0$, processing continues in an operation 930.

Similar to operation 248, in operation 928, the selected coefficient $a_k$ is updated, for example, using $$a_k = \max\left\{\Delta_k - \frac{\lambda}{\|V_m\|_s}, 0\right\},$$

and processing continues in an operation 932.

Similar to operation 250, in operation 930, the selected coefficient $a_k$ is updated, for example, using $$a_k = \max\left\{-\Delta_k - \frac{\lambda}{\|V_m\|_s}, 0\right\},$$

and processing continues in operation 932.

Similar to operation 252, in operation 932, the convergence value c is computed, for example, using $c=c+a_k-a'_k$ where $a'_k$ is a value of $a_k$ prior to the update in either operation 928 or operation 930.

Similar to operation 254, in an operation 934, the determination is made concerning whether there is another coefficient of the sparse coefficients to update. If there is another coefficient of the sparse coefficients to update, processing continues in an operation 936. If there is not another coefficient of the sparse coefficients to update, processing continues in an operation 938.

Similar to operation 256, in operation 936, the next coefficient $a_k$ is selected from the sparse coefficients a, and processing continues in operation 924.

Similar to operation 258, in operation 938, the determination is made concerning whether convergence has been achieved or the maximum number of iterations have been performed. If $c \leq c_{th}$ or $I \geq I_{max}$, processing continues in an operation 942. If $c>c_{th}$ and $I<I_{max}$, processing continues in an operation 940.

Similar to operation 260, in operation 940, the iteration counter I is incremented, for example, as I=I+1, and processing continues in operation 920.

Similar to operation 262, in operation 942, the classification matrix F is defined, for example, using $F=V_m a$.

Similar to operation 264, in an operation 944, each of the unclassified observation vectors in input unclassified data 126 is classified.

Similar to operation 266, in an operation 946, the classifications may be sent from each thread of each worker device 600 of worker system 306 to controller device 304, and processing continues in operation 806 of FIG. 8. Alternatively, a confirmation of completion of the classification process may be sent and the identified class for each observation vector $x_i$ may be stored in classification output data 128 possibly with the respective observation vector $x_i$. Classification output data 128 may be distributed across controller device 304 and/or worker system 306.

Figure 10A:
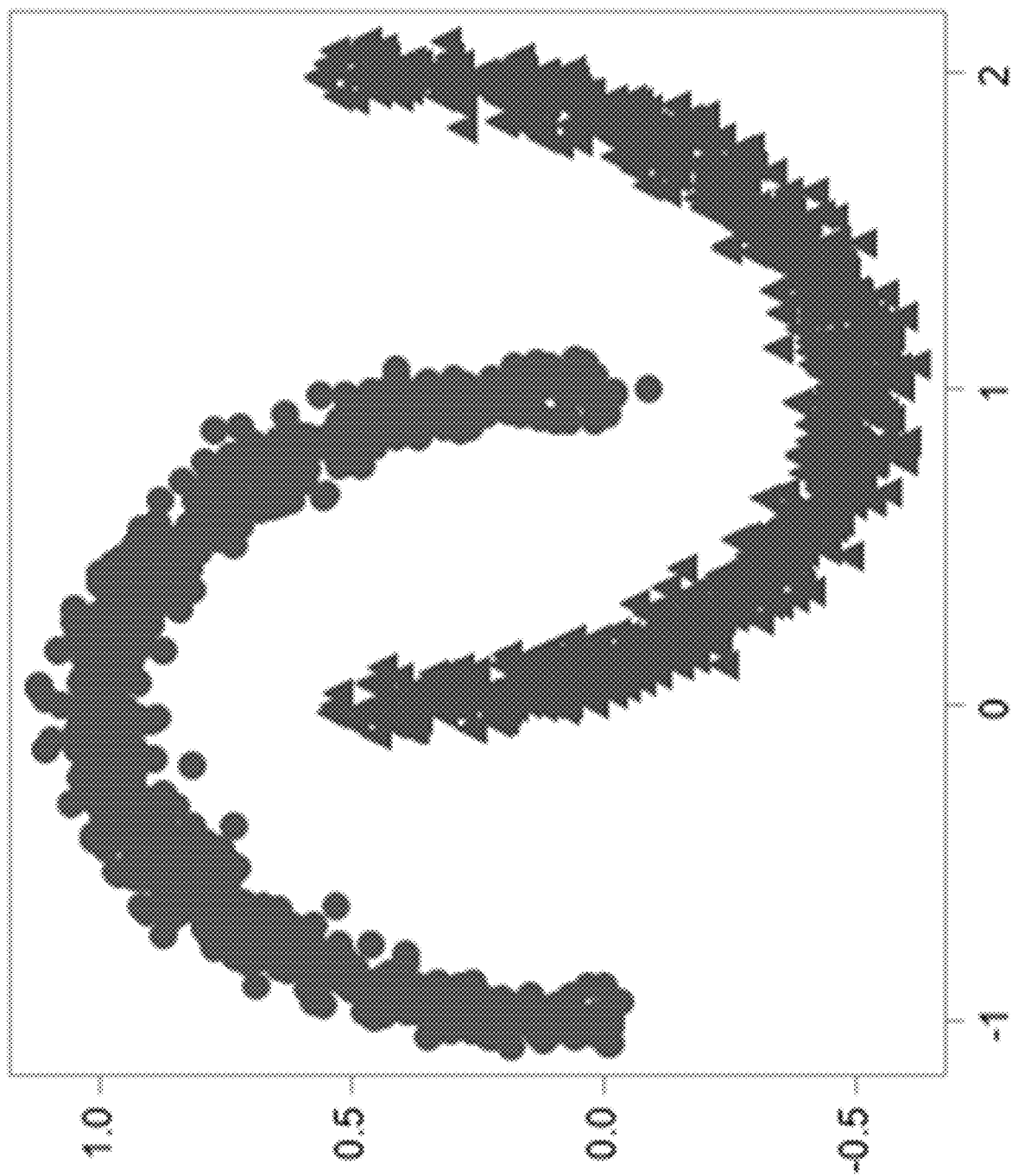
FIG. 10A shows input unclassified data in accordance with an illustrative embodiment.
Figure 10B:
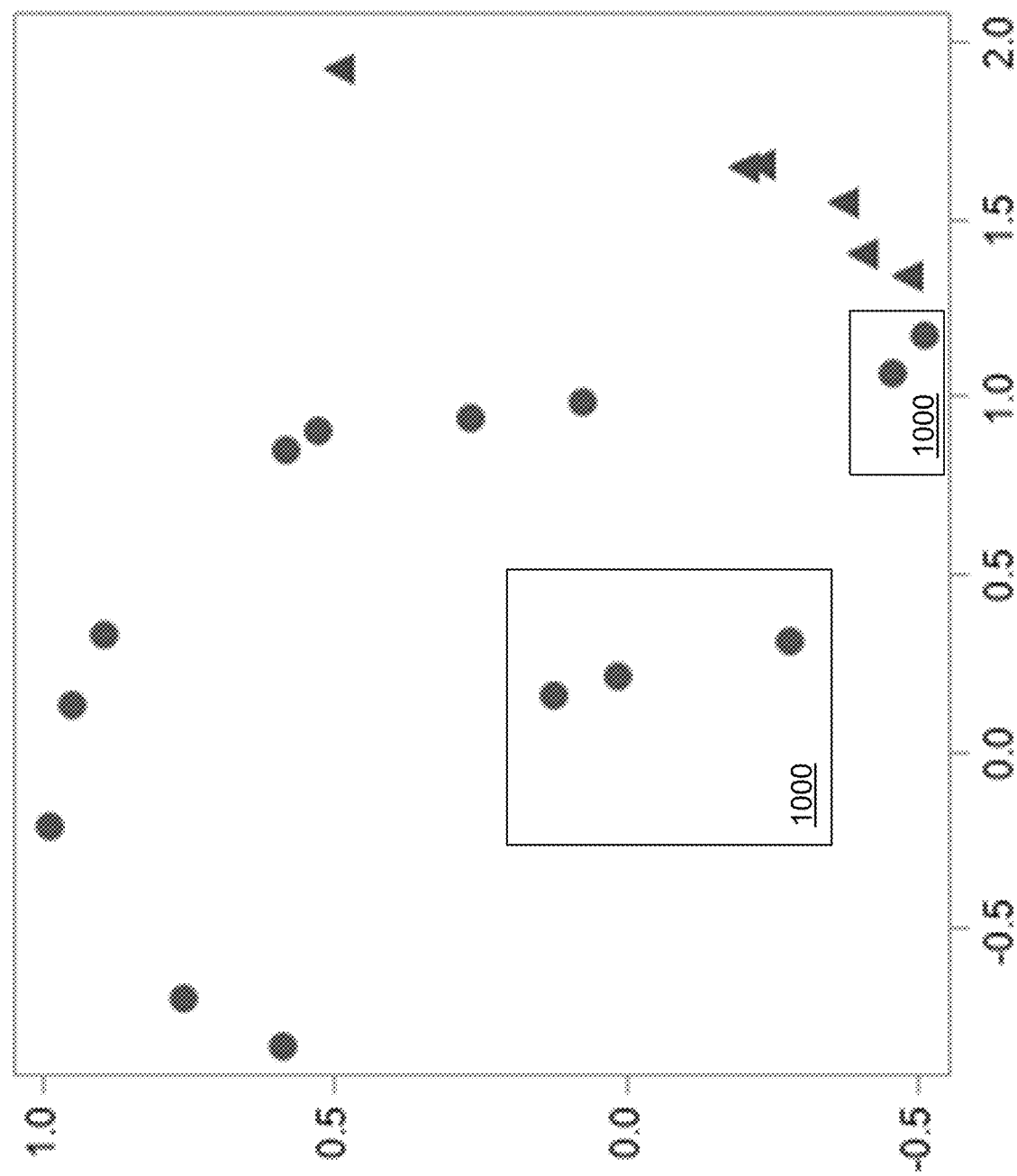
FIG. 10B shows input noisy classified data in accordance with an illustrative embodiment.
Figure 10C:
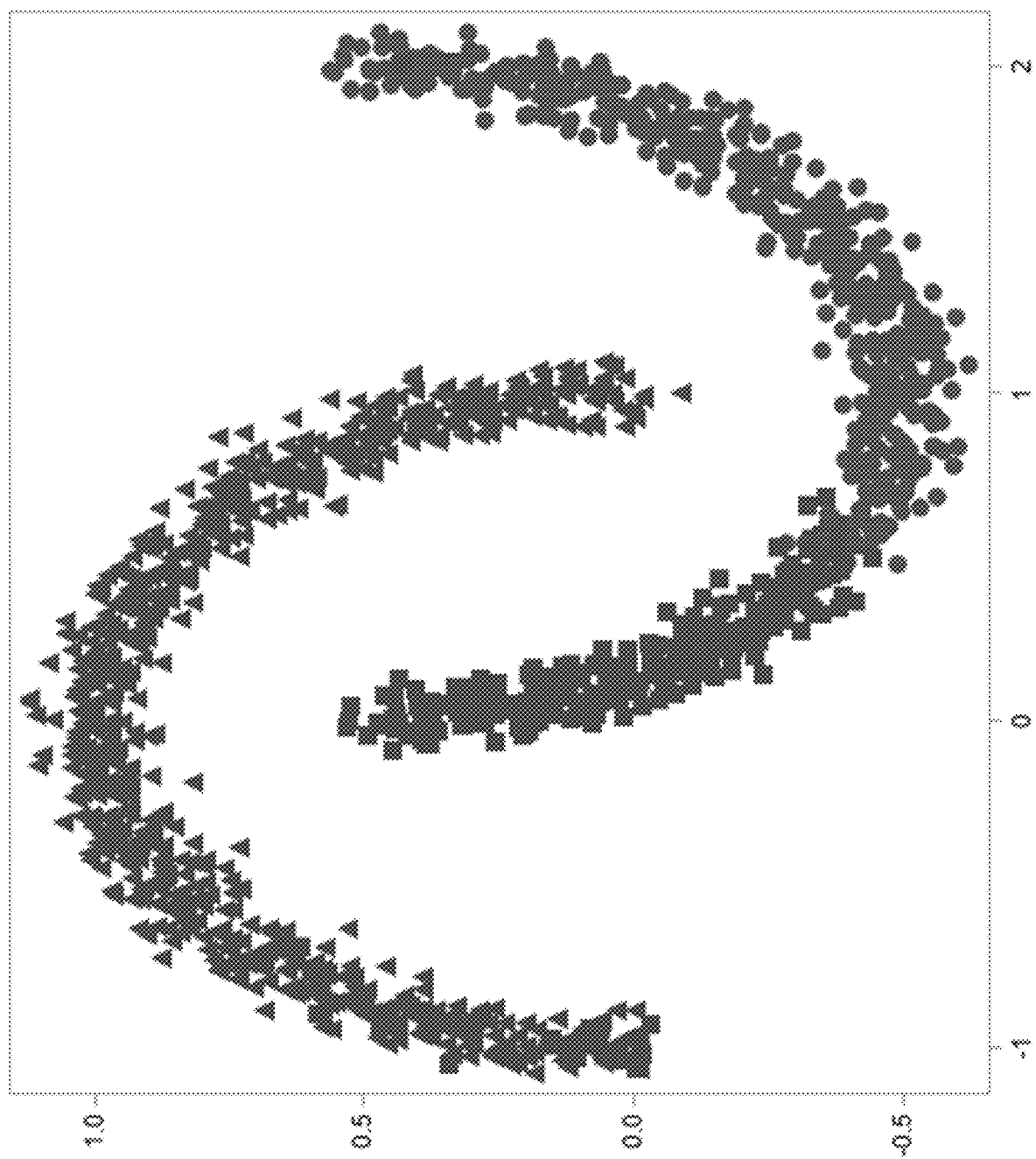
FIG. 10C shows a classification computed by the classification system of FIG. 3 with the input unclassified data of FIG. 10A and with the input noisy classified data of FIG. 10B in accordance with an illustrative embodiment.
Figure 10D:
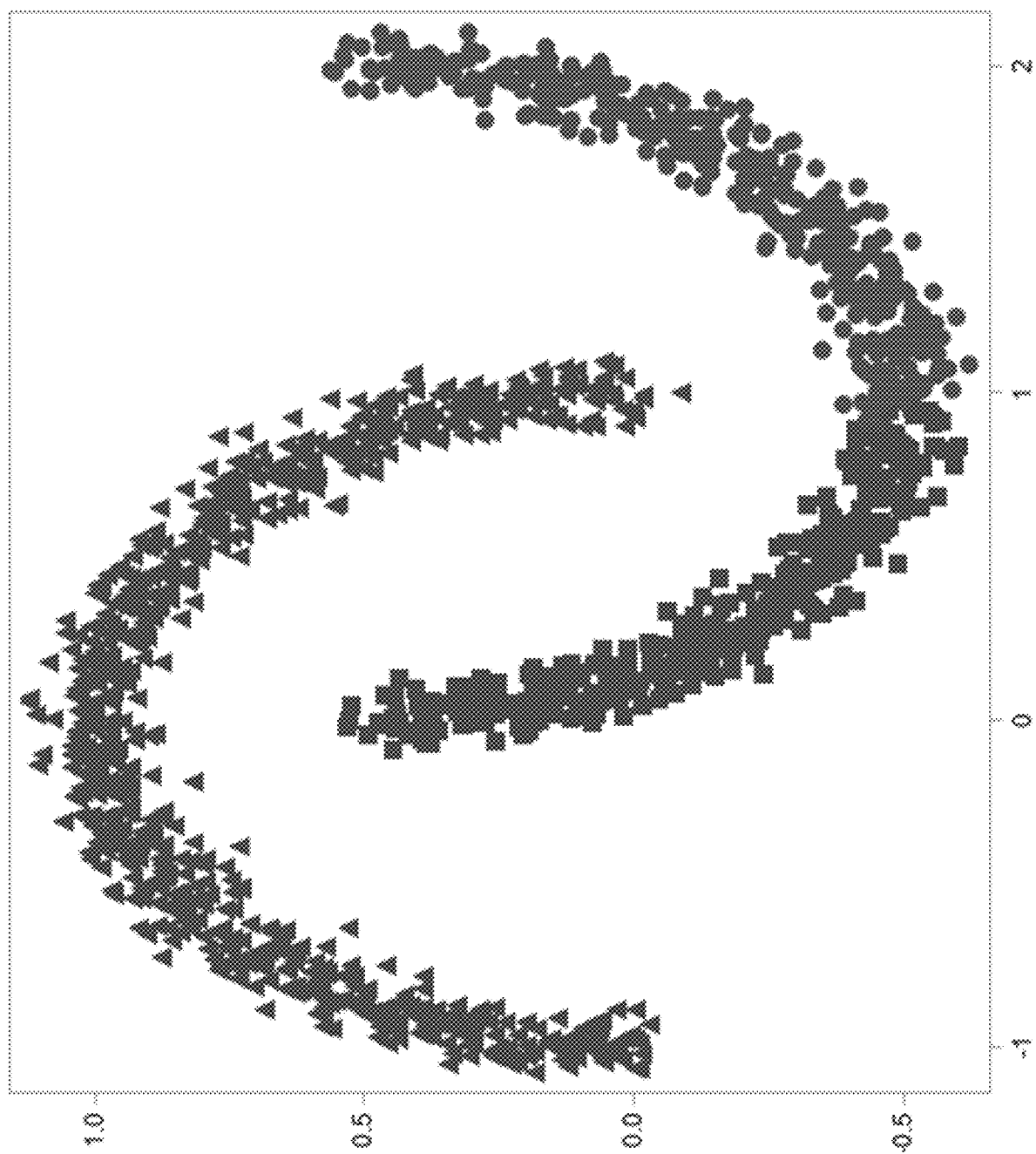
FIG. 10D shows a classification computed by an existing classification system with the input unclassified data of FIG. 10A and with the input noisy classified data of FIG. 10B in accordance with an illustrative embodiment.

Experimental results were generated using the operations of classification application 122 with a 2-dimensional (2-D) synthetic two moon dataset. Worker system 306 included 139 machines where each machine used 32 threads. Input unclassified data 126 included 1500 observation vectors shown in FIG. 10A with their correct labels. The circles show the observation vectors correctly assigned to class 1. The triangles show the observation vectors correctly assigned to class 2. Input classified data 124 included 20 classified observation vectors where 5 of the 20 classified observation vectors were noisy meaning the classification was incorrect. Input classified data 124 is shown in FIG. 10A where the observation vectors 1000 were the noisy observation vectors that were deliberately classified incorrectly. As a result, the noise level was 25 percent. The number of eigenvectors to select m was chosen to be 6. The sparse regularization parameter value λ was chosen to be 0.9. The classification results for input unclassified data 126 using classification application 122 are shown in FIG. 10C. The circles show the correctly classified observation vectors assigned to class 1. The triangles show the correctly classified observation vectors assigned to class 2. The squares show the incorrectly classified observation vectors. The classification results for input unclassified data 126 were generated using the method described in Zhou et al., *Learning with Local and Global Consistency*, Proceedings of the 16th International Conference on Neural Information Processing Systems, 321-328 (2003) that is referred to as existing semi-supervised classification method are shown in FIG. 10D. Again, the circles show the correctly classified observation vectors assigned to class 1; the triangles show the correctly classified observation vectors assigned to class 2; and the squares show the incorrectly classified observation vectors. Based on a comparison between FIGS. 10C and 10D, in the presence of noisy target variables (incorrectly classified observation vectors), classification application 122 successfully suppressed the target variables thereby significantly improving the classification accuracy. Classification application 122 applied zero or smaller weights to the incorrectly classified observation vectors and achieved a classification accuracy of 81.1%. The performance with the existing semi-supervised classification method achieved an accuracy of 76.4%. Therefore, classification application 122 provided a 4.7% performance improvement in terms of the total accuracy. Table I below shows a confusion matrix generated using classification application 122, and Table II below shows a confusion matrix generated using the existing semi-supervised classification method.

TABLE I

| Correct classification | Predicted classification 0 | 1 | Total |
|---|---|---|---|
| 0 | 743 | 21 | 764 |
| 1 | 266 | 490 | 756 |
| Total | 1009 | 511 | 1520 |

TABLE II

| Correct classification | Predicted classification 0 | 1 | Total |
|---|---|---|---|
| 0 | 764 | 0 | 764 |
| 1 | 359 | 397 | 756 |
| Total | 1123 | 397 | 1520 |

Experimental results were generated using the operations of classification application 122 with a credit card fraud detection dataset. The classification was binary and the goal was to detect whether the transaction is fraudulent or not fraudulent. The credit card fraud detection dataset is highly imbalanced where the fraudulent transactions only account for 0.198% of the total number of transactions. Worker system 306 included 139 machines where each machine used 32 threads. The input features included 28 user parameters, a transaction amount, and a time. Input unclassified data 126 included 100,000 observation vectors. Input classified data 124 included 100 classified observation vectors where 5 of the 20 classified observation vectors were noisy meaning the classification was deliberately incorrect.

The number of eigenvectors to select m was varied between 10, 12, and 15, the noise level (NL) was varied between 5% and 7%, and the sparse regularization parameter value λ was varied between 0.5, 0.6, 0.7, and 0.8. Different noise levels were generated by randomly flipping the target variables for binary classification. Table III below shows an accuracy comparison matrix generated using the credit card fraud detection dataset. The first seven columns show the results generated by classification application 122 with the listed values for NL in percent, m, and λ. The last two columns show the results generated by the existing semi-supervised classification method with the listed values for NL in percent.

TABLE III

Number of Eigenvectors, Noise Level (%), Sparse Regularization Parameter Value

|  | 5, 12, 0.6 | 7, 12, 0.6 | 5, 15, 0.7 | 5, 12, 0.7 | 5, 10, 0.7 | 5, 12, 0.8 | 5, 12, 0.5 | 5 | 7 |
|---|---|---|---|---|---|---|---|---|---|
| Recall | 77.39 | 77.22 | 74.87 | 77.34 | 76.35 | 73.89 | 77.34 | 72.90 | 62.37 |
| Precision | 81.34 | 81.25 | 80.85 | 80.92 | 80.72 | 80.64 | 80.92 | 80.87 | 81.81 |

Classification application 122 provided significantly more accurate results that increased with the noise level demonstrating the advantages of classification application 122. The recall of the existing semi-supervised classification method dropped more than 10% when the noise level increased from 5% to 7% while classification application 122 kept approximately the same performance in terms of precision and recall demonstrating the robustness of classification application 122 for noisy target variables.

There are applications for classification application 122, classification application 422, controller application 512, and/or worker application 612 in many areas such as process control and equipment health monitoring, image processing and classification, data segmentation, data analysis, etc. Classification application 422, controller application 512, and worker application 612 provide efficient distributed and parallel computing device implementations for performing classification. The presented results demonstrate improved model accuracies.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

compute a Laplacian matrix using a kernel function with a plurality of observation vectors, wherein the plurality of observation vectors includes a subset of a plurality of unclassified observation vectors and a plurality of classified observation vectors, wherein a target variable value is defined to represent a class for each respective observation vector of the plurality of classified observation vectors, wherein the plurality of unclassified observation vectors are distributed across a plurality of computing devices to define the subset of the plurality of unclassified observation vectors, and the plurality of classified observation vectors are stored on each computing device of the plurality of computing devices, wherein the computing device is one of the plurality of computing devices;

perform a decomposition of the computed Laplacian matrix;

select a predefined number of eigenvectors from the decomposed Laplacian matrix to define a decomposition matrix, wherein the predefined number of eigenvectors have smallest eigenvalues relative to other eigenvectors not selected from the decomposed Laplacian matrix;

(A) compute a gradient value as a function of the defined decomposition matrix, a plurality of sparse coefficients, and a label matrix defined from the plurality of observation vectors based on the target variable value;

(B) update a value of each coefficient of the plurality of sparse coefficients based on the computed gradient value;

repeat (A) to (B) until a convergence parameter value indicates the plurality of sparse coefficients have converged;

define a classification matrix using the plurality of sparse coefficients;

determine the target variable value for each observation vector of the subset of the plurality of unclassified observation vectors based on the defined classification matrix; and output the target variable value for each observation vector of the subset of the plurality of unclassified observation vectors to a second dataset, wherein the target variable value selected for each observation vector of the subset of the plurality of unclassified observation vectors identifies the class of a respective observation vector, wherein the computer-readable instructions are performed on each computing device of the plurality of computing devices using the plurality of classified observation vectors and a respective subset of the plurality of unclassified observation vectors distributed to each respective computing device.

2. The non-transitory computer-readable medium of claim 1, wherein the gradient value is computed using $G=V_m^T(V_m a-Y)$, where G is the gradient value, $V_m$ is the defined decomposition matrix, a is the plurality of sparse coefficients, Y is the label matrix, and T indicates a transpose.

3. The non-transitory computer-readable medium of claim 2, wherein the gradient value is an m×1 vector for a binary target variable value, where m is the predefined number of eigenvectors.

4. The non-transitory computer-readable medium of claim 2, wherein the gradient value is an m×c matrix for a target variable value having c possible class values, where m is the predefined number of eigenvectors.

5. The non-transitory computer-readable medium of claim 1, wherein the classification matrix is defined using $F=V_m a$, where F is the classification matrix, $V_m$ is the defined decomposition matrix, and a is the plurality of sparse coefficients.

6. The non-transitory computer-readable medium of claim 5, wherein the classification matrix is an N×1 matrix for a binary target variable value, where N is a number of the plurality of observation vectors.

7. The non-transitory computer-readable medium of claim 5, wherein the classification matrix is an N×c matrix for a label set having c possible class values, where N is a number of the plurality of observation vectors.

8. The non-transitory computer-readable medium of claim 1, wherein the label matrix is defined using $Y_{ik}=1$ if $x_i$ is labeled as $y_i=k$, otherwise $Y_{ik}=0$, where k=1, . . . , c, Y is the label matrix, $x_i$ is an $i^{th}$ observation vector of the plurality of observation vectors, $y_i$ is the target variable value of the $i^{th}$ observation vector of the plurality of observation vectors, and c is a number of unique values for the target variable value.

9. The non-transitory computer-readable medium of claim 1, wherein the label matrix is defined using $Y_i=1$ if $y_i$ indicates true, $Y_i=1$ if $y_i$ indicates false, otherwise $Y_i=0$, where Y is the label matrix, and $y_i$ is the target variable value of an $i^{th}$ observation vector of the plurality of observation vectors.

10. The non-transitory computer-readable medium of claim 1, wherein the decomposition of the computed Laplacian matrix is a singular value decomposition.

11. The non-transitory computer-readable medium of claim 1, wherein computing the Laplacian matrix comprises:

computing an affinity matrix using the kernel function and the plurality of observation vectors; and computing a diagonal matrix by summing each row of the computed affinity matrix, wherein the sum of each row is stored in a diagonal of a row with zeroes in remaining positions of the row;

wherein the Laplacian matrix is computed using the computed affinity matrix and the computed diagonal matrix.

12. The non-transitory computer-readable medium of claim 11, wherein the Laplacian matrix is computed using $L=1-D^{-1/2}WD^{-1/2}$, where L is the Laplacian matrix, I is an N×N identity matrix, N is a number of the plurality of observation vectors, D is the computed diagonal matrix, and W is the computed affinity matrix.

13. The non-transitory computer-readable medium of claim 12, wherein the affinity matrix is computed using $$W_{ij} = \exp\frac{-\|x_i - x_j\|^2}{2s^2} \text{ if } i \neq j \text{ and } W_{ii} = 0 \text{ for } i = j,$$

for i=1, . . . , N and j=1, . . . , N, where s is a predefined kernel parameter value, $x_i$ is an $i^{th}$ observation vector of the plurality of observation vectors, and $x_j$ is a $j^{th}$ observation vector of the plurality of observation vectors.

14. The non-transitory computer-readable medium of claim 1, wherein the convergence parameter value is a number of iterations of (B) and convergence is determined after a predefined maximum number of iterations of (B).

15. The non-transitory computer-readable medium of claim 1, wherein the convergence parameter value is computed using the updated value of each coefficient of the plurality of sparse coefficients.

16. The non-transitory computer-readable medium of claim 15, wherein the convergence parameter value is a sum of a difference between the value updated in (B) and the value prior to the update in (B) for each coefficient of the plurality of sparse coefficients.

17. The non-transitory computer-readable medium of claim 1, wherein updating the value of each coefficient of the plurality of sparse coefficients comprises:

computing a difference value using the defined decomposition matrix and the computed gradient value;

wherein the value is updated using $$a_k = \max\left\{|\Delta_k| - \frac{\lambda}{\|V_m\|_s}, 0\right\},$$

where $a_k$ is a $k^{th}$ coefficient of the plurality of sparse coefficients, $\Delta_k$ is the computed difference value for the $k^{th}$ coefficient of the plurality of sparse coefficients, $\lambda$ is a predefined sparse regularization parameter value, $V_m$ is the defined decomposition matrix, $|\Delta_k|$ indicates an absolute value of $\Delta_k$, and $\|V_m\|_s$ indicates a spectral norm of $V_m$.

18. The non-transitory computer-readable medium of claim 17, wherein the difference value is computed using $$\Delta_k = a_k - \frac{G(Q(a_k))}{\|V_m\|_s},$$

where $G(Q(a_k))$ is the gradient value for the $k^{th}$ coefficient of the plurality of sparse coefficients.

19. The non-transitory computer-readable medium of claim 1, wherein determining the target variable value comprises $$y_i = \operatorname*{argmax}_{j \leq c} F_{ij},$$

where $y_i$ is the target variable value of an $i^{th}$ observation vector of the plurality of observation vectors, F is the defined classification matrix, $F_{ij}$ is a probability value of the $i^{th}$ observation vector for a $j^{th}$ class, and c is a number of unique values for the target variable value.

20. The non-transitory computer-readable medium of claim 19, wherein the value of $y_i$ is an index into a predefined label set.

21. The non-transitory computer-readable medium of claim 1, wherein determining the target variable value comprises $y_i=1$ when $F_i>0$, and $y_i=-1$ when $F_i \leq 0$, where $y_i$ is the target variable value of an $i^{th}$ observation vector of the plurality of observation vectors, F is the defined classification matrix, and $F_i$ is a probability value of the $i^{th}$ observation vector.

22. The non-transitory computer-readable medium of claim 1, wherein the plurality of classified observation vectors include at least one observation vector classified incorrectly.

23. The non-transitory computer-readable medium of claim 1, wherein the target variable value for each observation vector of the plurality of unclassified observation vectors is output to the second dataset with the plurality of unclassified observation vectors.

24. A system comprising:
a plurality of computing devices, wherein each computing device of the plurality of computing devices comprises
a processor; and
a non-transitory computer-readable medium operably coupled to the processor, the computer-readable medium having computer-readable instructions stored thereon that, when executed by the processor, cause each respective computing device to
compute a Laplacian matrix using a kernel function with a plurality of observation vectors, wherein the plurality of observation vectors includes a subset of a plurality of unclassified observation vectors and a plurality of classified observation vectors, wherein a target variable value is defined to represent a class for each respective observation vector of the plurality of classified observation vectors, wherein the plurality of unclassified observation vectors are distributed across the plurality of computing devices to define each subset of the plurality of unclassified observation vectors and the plurality of classified observation vectors are stored on each computing device of the plurality of computing devices;
perform a decomposition of the computed Laplacian matrix;
select a predefined number of eigenvectors from the decomposed Laplacian matrix to define a decomposition matrix, wherein the predefined number of eigenvectors have smallest eigenvalues relative to other eigenvectors not selected from the decomposed Laplacian matrix;
(A) compute a gradient value as a function of the defined decomposition matrix, a plurality of sparse coefficients, and a label matrix defined from the plurality of observation vectors based on the target variable value;
(B) update a value of each coefficient of the plurality of sparse coefficients based on the computed gradient value;
repeat (A) to (B) until a convergence parameter value indicates the plurality of sparse coefficients have converged;
define a classification matrix using the plurality of sparse coefficients;
determine the target variable value for each observation vector of the subset of the plurality of unclassified observation vectors based on the defined classification matrix; and
output the target variable value for each observation vector of the subset of the plurality of unclassified observation vectors to a second dataset, wherein the target variable value selected for each observation vector of the subset of the plurality of unclassified observation vectors identifies the class of a respective observation vector.

25. A method of predicting occurrence of an event or classifying an object using semi-supervised data to label unlabeled data in a dataset, the method comprising:
computing, by a computing device, a Laplacian matrix using a kernel function with a plurality of observation vectors, wherein the plurality of observation vectors includes a subset of a plurality of unclassified observation vectors and a plurality of classified observation vectors, wherein a target variable value is defined to represent a class for each respective observation vector of the plurality of classified observation vectors, wherein the plurality of unclassified observation vectors are distributed across a plurality of computing devices to define the subset of the plurality of unclassified observation vectors and the plurality of classified observation vectors are stored on each computing device of the plurality of computing devices, wherein the computing device is one of the plurality of computing devices;
performing, by the computing device, a decomposition of the computed Laplacian matrix;
selecting, by the computing device, a predefined number of eigenvectors from the decomposed Laplacian matrix to define a decomposition matrix, wherein the predefined number of eigenvectors have smallest eigenvalues relative to other eigenvectors not selected from the decomposed Laplacian matrix;
(A) computing, by the computing device, a gradient value as a function of the defined decomposition matrix, a plurality of sparse coefficients, and a label matrix defined from the plurality of observation vectors based on the target variable value;
(B) updating, by the computing device, a value of each coefficient of the plurality of sparse coefficients based on the computed gradient value;
repeating, by the computing device, (A) to (B) until a convergence parameter value indicates the plurality of sparse coefficients have converged;
defining, by the computing device, a classification matrix using the plurality of sparse coefficients;
determining, by the computing device, the target variable value for each observation vector of the subset of the plurality of unclassified observation vectors based on the defined classification matrix; and outputting, by the computing device, the target variable value for each observation vector of the subset of the plurality of unclassified observation vectors to a second dataset, wherein the target variable value selected for each observation vector of the subset of the plurality of unclassified observation vectors identifies the class of a respective observation vector, wherein the method is performed on each computing device of the plurality of computing devices using the plurality of classified observation vectors and a respective subset of the plurality of unclassified observation vectors distributed to each respective computing device.

26. The method of claim 25, wherein the gradient value is computed using $G=V_m^T(V_m a-Y)$, where G is the gradient value, $V_m$ is the defined decomposition matrix, a is the plurality of sparse coefficients, Y is the label matrix, and T indicates a transpose.

27. The method of claim 25, wherein the classification matrix is defined using $F=V_m a$, where F is the classification matrix, $V_m$ is the defined decomposition matrix, and a is the plurality of sparse coefficients.

28. The method of claim 25, wherein the convergence parameter value is computed using the updated value of each coefficient of the plurality of sparse coefficients.

29. The method of claim 25, wherein updating the value of each coefficient of the plurality of sparse coefficients comprises:

computing a difference value using the defined decomposition matrix and the computed gradient value;

wherein the value is updated using $$a_k = \max\left\{|\Delta_k| - \frac{\lambda}{\|V_m\|_s}, 0\right\},$$

where $a_k$ is a $k^{th}$ coefficient of the plurality of sparse coefficients, $\Delta_k$ is the computed difference value for the $k^{th}$ coefficient of the plurality of sparse coefficients, $\lambda$ is a predefined sparse regularization parameter value, $V_m$ is the defined decomposition matrix, $|\Delta_k|$ indicates an absolute value of $\Delta_k$, and $\|V^m\|_s$ indicates a spectral norm of $V_m$.

30. The method of claim 29, wherein the difference value is computed using $$\Delta_k = a_k - \frac{G(Q(a_k))}{\|V_m\|_s},$$

where $G(Q(a_k))$ is the gradient value for the $k^{th}$ coefficient of the plurality of sparse coefficients.

* * * * *

UNITED STATES PATENT AND TRADEMARK OFFICE
CERTIFICATE OF CORRECTION

PATENT NO. : 11,100,428 B2
APPLICATION NO. : 16/706912
DATED : August 24, 2021
INVENTOR(S) : Chen It is certified that error appears in the above-identified patent and that said Letters Patent is hereby corrected as shown below:

In the Specification

Column 11, Line 62:
Delete the phrase "$D_{ii} = \sum_{j=1}^{N} W_{ij}$" and replace with -- $D_{ii} = \sum_{j=1}^{N} W_{ij}$ --.

Column 12, Line 23:
Delete the phrase "$G(Q(a)) = V_m^T(V_m a - Y)$," and replace with -- $G(Q(a)) = V_m^T(V_m a - Y),$ --.

In the Claims

Claim 2, Column 25, Lines 24-25:
Delete the phrase "$G = V_m^T(V_m a - Y)$," and replace with -- $G = V_m^T(V_m a - Y),$ --.

Claim 26, Column 29, Line 14:
Delete the phrase "$G = V_m^T(V_m a - Y)$," and replace with -- $G = V_m^T(V_m a - Y),$ --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*